(12) United States Patent
Hwang et al.

(10) Patent No.: US 10,838,539 B2
(45) Date of Patent: Nov. 17, 2020

(54) TOUCH DISPLAY DEVICE, TOUCH DRIVING CIRCUIT, AND TOUCH SENSING METHOD

(71) Applicant: LG Display Co., Ltd., Seoul (KR)

(72) Inventors: JuneYoun Hwang, Goyang-si (KR); BeomJin Kim, Seoul (KR); HyungUk Jang, Paju-si (KR); SangHyuck Bae, Paju-si (KR); Sungsu Han, Goyang-si (KR); Suyun Ju, Gangwon-do (KR); DoYoung Jung, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 14 days.

(21) Appl. No.: 15/798,161

(22) Filed: Oct. 30, 2017

(65) Prior Publication Data

US 2018/0150177 A1    May 31, 2018

(30) Foreign Application Priority Data

Oct. 31, 2016  (KR) .................. 10-2016-0143855
Sep. 15, 2017  (KR) .................. 10-2017-0118671

(51) Int. Cl.
*G06F 3/041*  (2006.01)
*G06F 3/044*  (2006.01)
*G09G 5/00*   (2006.01)

(52) U.S. Cl.
CPC ............ *G06F 3/0416* (2013.01); *G06F 3/044* (2013.01); *G09G 5/003* (2013.01); *G06F 2203/04107* (2013.01)

(58) Field of Classification Search
CPC ........................................ G06F 3/044
See application file for complete search history.

(56) References Cited

U.S. PATENT DOCUMENTS

| | | | | |
|---|---|---|---|---|
| 2014/0267108 A1* | 9/2014 | Chung | ................ | G06F 3/044 345/173 |
| 2015/0002441 A1* | 1/2015 | Brunet | ................ | G06F 3/044 345/174 |
| 2016/0179273 A1* | 6/2016 | Lee | ................ | G06F 3/0416 345/174 |

* cited by examiner

*Primary Examiner* — Robin J Mishler
(74) *Attorney, Agent, or Firm* — Polsinelli PC

(57) ABSTRACT

There are provided a touch display device, a touch driving circuit, and a touch sensing method. More specifically, a touch display device includes a touch screen panel including a plurality of touch electrodes and a touch driving circuit configured to output a touch driving signal to at least a portion of the plurality of touch electrodes for sensing a touch. Upon detection of an event in which at least one first area of the touch screen panel is set as a touch sensing area and at least one second area of the touch screen panel is set as a non-touch sensing area, the touch driving circuit is configured to output the touch driving signal to one or more of the plurality of touch electrodes that correspond to the at least one first area of the touch screen panel.

20 Claims, 28 Drawing Sheets

TOUCH DISPLAY DEVICE, TOUCH DRIVING CIRCUIT, AND TOUCH SENSING METHOD

CROSS-REFERENCE TO RELATED APPLICATIONS

This application claims priority from Korean Patent Application Nos. 10-2016-0143855 and 10-2017-0118671, filed on Oct. 31, 2016 and Sep. 15, 2017, respectively, which are hereby incorporated by reference for all purposes as if fully set forth herein.

BACKGROUND OF THE DISCLOSURE

Field of the Disclosure

The present disclosure relates to a touch display device, a touch driving circuit, and a touch sensing method.

Background

With progress of the information-oriented society, the demand for a variety of display devices for displaying an image is increasing. Recently, various types of display devices such as a liquid crystal display (LCD) device, a plasma display panel (PDP) device, or an organic light emitting display (OLED) device have come into widespread use.

Such display devices are breaking away from conventional input systems, such as a button, a keyboard and a mouse, and instead touch input display devices provided with touch-based input systems which allow a user to intuitively and conveniently input information or instructions have been developed.

In order to provide such a touch-based input system, it is required to identify a touch or non-touch of a user and exactly detect touch coordinates (touch position).

To this end, a capacitance-based touch sensing method of detecting a touch or non-touch and touch coordinates on the basis of a change in capacitance between a plurality of touch electrodes disposed in a touch screen panel as touch sensors or between the touch electrodes and a pointer such as a finger has been widely employed.

Meanwhile, only a part of a screen of a touch display device may be set as a touch sensing area. In this case, when both the touch sensing area and non-touch sensing other areas of the touch display device (e.g., non-touch sensing areas) are touched, touch sensitivity to a touch on the touch sensing area is greatly decreased.

SUMMARY OF THE DISCLOSURE

An aspect of the present disclosure provides a touch display device, a touch driving circuit, and a touch sensing method which make it possible to suppress a sharp decrease in touch sensitivity to a touch on a touch sensing area even when both the touch sensing area and a non-touch sensing area are touched when only a part of a screen of a touch display device is set as the touch sensing area.

An aspect of the present disclosure also provides a touch display device, a touch driving circuit, and a touch sensing method enabling an improved sensing of a touch through a part of a cover case covering the screen of the touch display device when only a part of a screen is exposed through the part of the cover case.

In one aspect of the present disclosure, a touch display device includes a touch screen panel including a plurality of touch electrodes and a touch driving circuit configured to output a touch driving signal to at least a portion of the plurality of touch electrodes for sensing a touch. Upon detection of an event in which at least one first area of the touch screen panel is set as a touch sensing area and at least one second area of the touch screen panel is set as a non-touch sensing area, the touch driving circuit is configured to output the touch driving signal to one or more of the plurality of touch electrodes that correspond to the at least one first area of the touch screen panel.

In another aspect of the present disclosure, the touch driving circuit is configured to detect the event when the touch screen panel is covered with a cover case including at least one first cover area corresponding to the at least one first area and at least one second cover area corresponding to the at least one second area.

In another aspect of the present disclosure, after the event is detected, at least one first data line in the at least one first area is applied with a signal identical to the touch driving signal, and at least one second data line in the at least one second area is applied with a signal different from the touch driving signal or is in an electrically open state.

In another aspect of the present disclosure, in the non-touch sensing area, after the event is detected, a first voltage is input into at least one first data line in the at least one first area, the first voltage being a voltage for displaying an image, and a second voltage is input into at least one second data line in the at least one second area, the second voltage being a voltage for not displaying an image.

In another aspect of the present disclosure, in the touch sensing area, after the event is detected, one or more touch electrodes in at least one column of the at least one first area that are most adjacent to the at least one second area are applied with a signal different from the touch driving signal or are in an electrically open state.

In another aspect of the present disclosure, an intensity of the touch driving signal to be applied to the one or more touch electrodes in the touch sensing area changes after the event is detected compared to when the event is not detected.

In another aspect of the present disclosure, in the touch sensing area, after the event is detected, at least one first gate line in the at least one first area is applied with a signal identical to the touch driving signal, and at least one second gate line in the at least one second area is applied with a signal different from the touch driving signal or is in an electrically open state.

In one aspect of the present disclosure, a touch driving circuit is configured to drive a plurality of touch electrodes in a touch screen panel. The touch driving circuit includes an output unit configured to provide an input touch driving signal to at least a portion of the plurality of touch electrodes for sensing a touch. The touch driving circuit also includes a control unit configured to, upon detection of an event according to which a first area of the touch screen panel is set to be a touch sensing area and a second area of the touch screen panel is set to be a non-touch sensing area, provide the input touch driving signal to one or more of the plurality of touch electrodes corresponding to the first area, and one of (1) provide a signal different from the touch driving signal to one or more of the plurality of touch electrodes corresponding to the second area of the touch screen panel, or (2) control the one or more of the plurality of touch electrodes corresponding to the second area to be in an electrically open state.

In another aspect of the present disclosure, the control unit includes a first switch configured to control a connection between the output unit and each of the portion of the plurality of the touch electrode, before the event is detected, the first switch is turned on to connect the output unit to the touch electrode, and after the event is detected, the first switch is turned off to disconnect the output unit from the touch electrode.

In another aspect of the present disclosure, the control unit includes a second switch configured to control a connection between the one or more of the plurality of touch electrodes and a direct current (DC) voltage node, wherein before the event is detected, the second switch is turned off to disconnect the one or more of the plurality of touch electrodes from the DC voltage node, and after the event is detected, the second switch is turned on to connect the one or more of the plurality of touch electrode to the DC voltage node.

In another aspect of the present disclosure, the control unit includes a third switch configured to control inputting the touch driving signal into the output unit, before the event is detected, the third switch is turned on to input the touch driving signal into the output unit, and after the event is detected, the third switch is turned off to not input the touch driving signal into the output unit.

In another aspect of the present disclosure, the control unit includes a fourth switch configured to control inputting of a direct current (DC) voltage into the output unit, before the event is detected, the fourth switch is turned off to not input the DC voltage into the output unit, and after the event is detected, the fourth switch is turned on so as to input the DC voltage into the output unit.

In another aspect of the present disclosure, in the touch sensing area, after the event is detected, at least one first data line in the first area is applied with a signal identical to the touch driving signal, and at least one second data line in the second area is applied with a signal different from the touch driving signal or is in an electrically open state.

In another aspect of the present disclosure, in the non-touch sensing area, after the event is detected, a first voltage is input into at least one first data line in the first area, the first voltage being a voltage for displaying an image, and a second voltage is input into at least one second data line in the second area, the second voltage being a voltage for not displaying an image.

In another aspect of the present disclosure, in the touch sensing area, after the event is detected, one or more touch electrodes in at least one column of the first area that are most adjacent to the second area are applied with a signal different from the touch driving signal or are in an electrically open state.

In another aspect of the present disclosure, an intensity of the touch driving signal to be applied to the one or more touch electrodes in the touch sensing area changes after the event is detected compared to when the event is not detected.

In one aspect of the present disclosure, a method includes supplying a touch driving signal to a plurality of touch electrodes forming a touch display of a device, detecting an event, the event resulting in partitioning the touch display into at least one first portion and at least one second portion, upon detecting the event, outputting the touch driving signal to one or more of the plurality of touch electrodes corresponding to the at least one first portion for sensing at least one first touch and controlling one or more of the plurality of touch electrodes corresponding to the at least one second portion such that at least one second touch anywhere on the at least one second portion is distinguishable from the at least one first touch; and determining coordinates of the at least one first touch and the at least one second touch.

In another aspect of the present disclosure, the detecting an event detects the event when a cover case is closed covering a portion of a surface of the touch display, the cover case having at least one first cover portion and at least one second cover portion corresponding to the at least one first portion and the at least one second portion of the touch display, respectively.

In another aspect of the present disclosure, the controlling controls the second portion of the plurality of touch electrodes by outputting a signal different from the touch driving signal to each of the second portion of the plurality of touch electrodes.

In another aspect of the present disclosure, the controlling controls the second portion of the plurality of touch electrodes by maintaining each of the second portion of the plurality of touch electrodes in an electrically open state.

In one aspect of the present disclosure, a touch display device includes a touch screen panel in which a plurality of touch electrodes is disposed, and a touch driving circuit configured to drive some or all of the plurality of touch electrodes during a touch sensing section. During the touch sensing section, one or more touch electrodes corresponding to one or more first areas of the touch screen panel are applied with the touch driving signal and one or more touch electrodes corresponding to one or more second areas of the touch screen pane different from the one or more first areas i are applied with a signal different from the touch driving signal or may be in an electrically open state.

In another aspect of the present disclosure, when an event occurs, the one or more touch electrodes corresponding to the one or more first areas are applied with a touch driving signal and the one or more touch electrodes corresponding to the one or more second areas are applied with a signal different from the touch driving signal or may be in an electrically open state.

In another aspect of the present disclosure, the signal that is different from the touch driving signal is different with respect to at least one signal characteristic, the least one signal characteristic including a signal amplitude, a signal phase, a signal voltage polarity, and a signal frequency.

In the touch display device, the one or more first areas may correspond to a touch sensing area and the one or more second areas may be excluded from the touch sensing area.

The touch screen panel may be provided within a display panel, and the first area may be at least one in number and may correspond to a display area where a predetermined image is displayed in case of the event.

In another aspect of the present disclosure, there is provided a touch driving circuit that drives a plurality of touch electrodes disposed in a touch screen panel.

The touch driving circuit includes an output unit configured to output a touch driving signal for driving some or all of the plurality of touch electrodes during a touch sensing section, and a control unit configured to control the touch driving signal to be applied to one or more touch electrodes corresponding to one or more first areas as a part of the touch screen panel and a signal different from the touch driving signal to be applied to one or more touch electrodes corresponding to one or more second areas different from the one or more first areas in the touch screen panel or control the one or more touch electrodes corresponding to the one or more second areas to be in an electrically open state.

If a predefined event occurs, the control unit of the touch driving circuit may control the one or more touch electrodes corresponding to the one or more first areas to be applied with the touch driving signal and the one or more touch electrodes corresponding to the one or more second areas to be applied with a signal different from the touch driving signal or to be in an electrically open state. Herein, the signal different from the touch driving signal may be different from the touch driving signal in at least one of amplitude, phase, and frequency.

In another aspect of the present disclosure, there is provided a touch sensing method. The touch sensing method includes sensing a touch by driving some or all of a plurality of touch electrodes disposed in a touch screen panel with a touch driving signal during a touch sensing section and sensing a touch by driving one or more touch electrodes corresponding to one or more first areas as a part of the touch screen panel with the touch driving signal in a state where one or more touch electrodes corresponding to one or more second areas different from the one or more first areas are driven with a signal different from the touch driving signal or are in an electrically open state, during a touch sensing section in a different timing.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
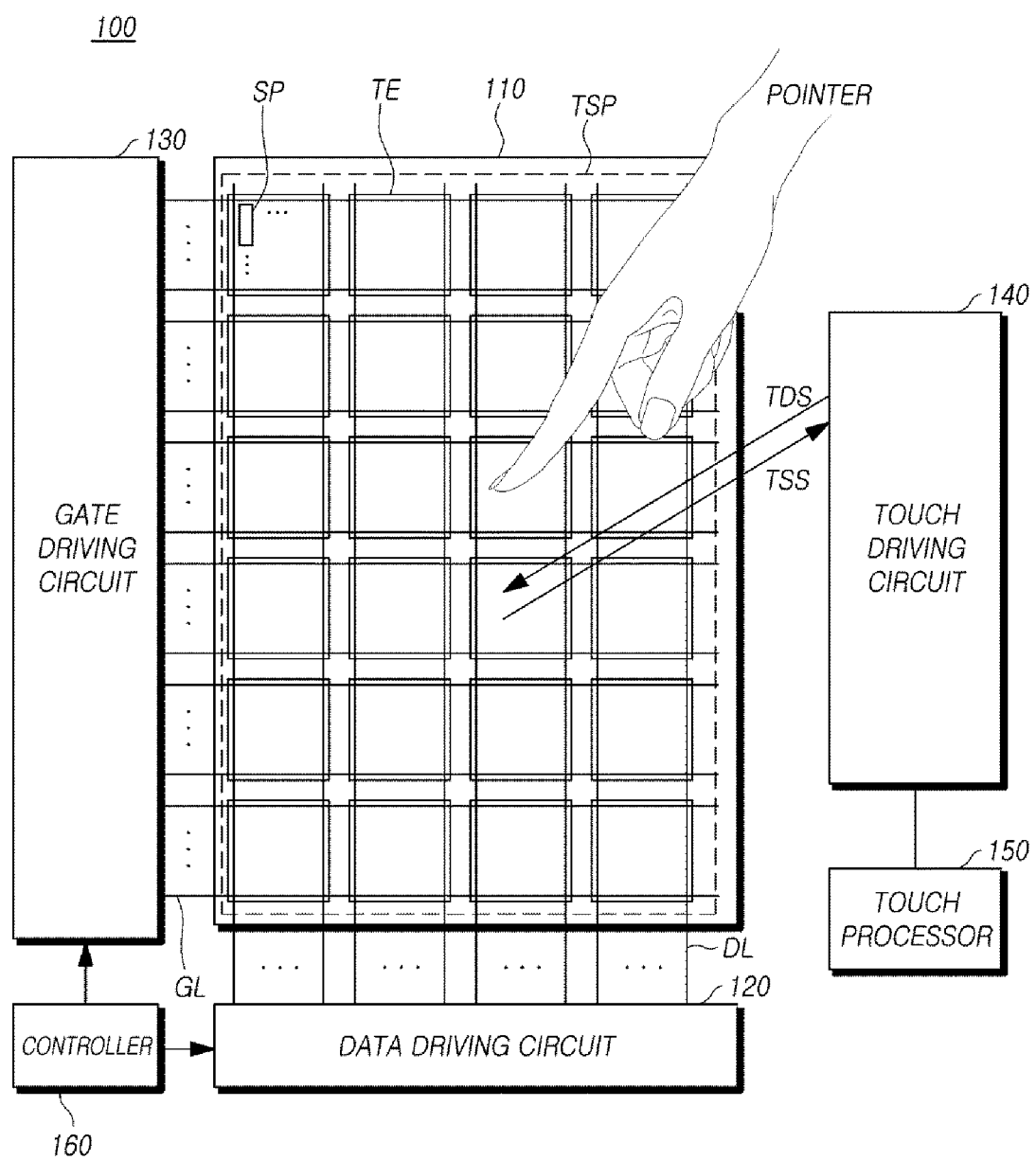
FIG. 1 is a system configuration view of a touch display device according to an aspect of the present disclosure.

Hereinafter, the present disclosure will be described in detail with reference to the accompanying drawings. While specific implementations are discussed, it should be understood that this is done for illustration purposes only. A person skilled in the relevant art will recognize that other components and configurations may be used without parting from the spirit and scope of the disclosure.

When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative example mutually exclusive of other examples. Moreover, various features are described which may be exhibited by some examples and not by others. Similarly, various requirements are described which may be requirements for some examples but not other examples.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Further, in describing components of the present disclosure, terms such as first, second, A, B, (a), (b), etc. can be used. These terms are used only to differentiate the components from other components. For example, a first element could be termed a second element, and similarly, a second element could be termed a first element, without departing from the scope of this disclosure. As used herein, the term "and/or," includes any and all combinations of one or more of the associated listed items.

Therefore, the nature, order, sequence, etc. of the corresponding components are not limited by these terms. It is to be understood that when one element is referred to as being "connected to" or "coupled to" another element, it may be directly connected or coupled to another element or be connected or coupled to another element, having still another element "connected" or "coupled" therebetween. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring example examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

FIG. 1 is a system configuration view of a touch display device 100 according to an aspect of the present disclosure.

Referring to FIG. 1, the touch display device 100 can include a display panel 110 and various circuits.

The touch display device 100 can perform a display function of displaying an image and a touch function of sensing a touch of a pointer such as a finger or a pen.

The touch display device 100 can include a touch screen panel TSP in order to perform the touch function.

The touch screen panel TSP can be outside the display panel 110 (separate from the display panel 110). In this case, the touch screen panel TSP may be of an add-on type attached to the display panel 110.

Otherwise, the touch screen panel TSP can be included in (be part of) the display panel 110. In this case, the touch screen panel TSP can be of an in-cell or on-cell type provided within the display panel 110.

In the following description, for convenience in explanation, the touch screen panel TSP will be described as being part of the display panel 110. Therefore, in the following, the touch screen panel TSP will be described as the display panel 110. That is, the display panel 110 described below includes the functionality of the touch screen panel TSP.

Meanwhile, the touch display device 100 can separately perform the display function and the touch function at different times.

In other words, in the touch display device 100 a display section for performing the display function and a touch section for performing the touch function may be separate in time from each other.

In this case, the touch display device 100 performs display driving for displaying an image and touch driving for sensing a touch in a time-division manner.

Alternatively, the touch display device 100 can simultaneously perform the display function and the touch function instead of separately performing the display function and the touch function at different times.

In other words, in the touch display device 100 the display section for performing the display function and the touch section for performing the touch function can be completely or partially overlapped with each other.

In this case, the touch display device 100 can simultaneously perform the display driving for displaying an image and the touch driving for sensing a touch.

In the display panel 110, a plurality of data lines DL and a plurality of gate lines GL for the display function can be disposed and a plurality of sub-pixels SP defined by the plurality of data lines DL and the plurality of gate lines GL may be aligned, as shown in FIG. 1.

Since the display panel 110 can also function as the touch screen panel TSP, a plurality of touch electrodes TE functioning as touch sensors can be provided and disposed within the display panel 110, as shown in FIG. 1.

Accordingly, the display panel 110 is described as including the touch screen panel TSP and may be referred to as "touch screen built-in display panel" 110.

Referring to FIG. 1, the touch display device 100 can include a data driving circuit 120 configured to output a data signal for driving the plurality of data lines DL in the display panel 110 and a gate driving circuit 130 configured to output a gate signal for driving the plurality of gate lines GL in the display panel 110 in order to perform the display function.

The touch display device 100 can further include at least one controller 160 configured to control operation timing or power supply for the data driving circuit 120 and the gate driving circuit 130.

Referring to FIG. 1, the touch display device 100 can include a touch driving circuit 140 configured to drive the plurality of touch electrodes TE provided and disposed in the display panel 110 and a touch processor 150 configured to determine a touch or non-touch and/or a touch position on the basis of a signal TSS, as shown in FIG. 1, received from a driven touch electrode TE in order to perform the touch function.

The touch driving circuit 140 can supply a touch driving signal TDS, as shown in FIG. 1, to the plurality of touch electrodes TE in order to drive the plurality of touch electrodes TE.

Also, the touch driving circuit 140 can receive a touch sensing signal TSS from each of the touch electrodes TE to which the touch driving signal TDS is supplied.

The touch driving circuit 140 transfers the received touch sensing signal TSS or its sensing data as a result of signal processing to the touch processor 150.

The touch processor 150 can execute a touch algorithm (touch sensing process) using the touch sensing signal TSS or sensing data and thus determine a touch or non-touch and/or a touch position. Accordingly, the touch processor 150 can be configured to execute a set of computer-readable instructions, transforming the touch processor 150 into a special purpose processor that enables the processor to determine a touch, a non-touch and a touch position according to various aspects of the present disclosure.

As described above, the touch display device 100 can employ a self-capacitance-based touch sensing method in which a change in capacitance between each touch electrode TE and a pointer is recognized to find out a touch or non-touch and/or a touch position.

That is, in the touch display device 100, the touch driving signal TDS is applied to each touch electrode TE and the touch sensing signal TSS is detected from each touch electrode TE.

Meanwhile, the touch display device 100 can employ a mutual-capacitance-based touch sensing method in which the plurality of touch electrodes TE are divided into driving electrodes (also referred to as Tx electrodes) and sensing electrodes (also referred to as Rx electrodes), the touch driving signal TDS is applied to the driving electrodes and then the touch sensing signal TSS is received from the sensing electrodes, and a change in capacitance between the driving electrodes and the sensing electrodes is recognized to determine a touch or non-touch and/or a touch position.

In the following description, for convenience in explanation, the touch display device 100 employing the self-capacitance-based touch sensing method will be described. However, the present disclosure is not limited thereto and the following description is equally applicable to the touch display device 100 employing a mutual-capacitance-based touch sensing, described above, and/or any other known or to be developed touch sensing method.

According to the self-capacitance-based touch sensing method, in the touch screen built-in display panel 110, the driving electrodes (also referred to as Tx electrodes) to which the touch driving signal TDS is applied to perform touch driving and the sensing electrodes (also referred to as Rx electrodes) from which the touch sensing signal TSS is detected do not need to be separately disposed. Therefore, a panel process can become easier.

Meanwhile, the data driving circuit 120, the gate driving circuit 130, the touch driving circuit 140, and the touch processor 150 described above are classified by function. These components can be separately implemented, or in some cases, two or more of the data driving circuit 120, the gate driving circuit 130, the touch driving circuit 140, and the touch processor 150 can also be implemented in combination.

According to one or more examples, one touch electrode TE can be greater in size than one sub-pixel SP. That is, one touch electrode TE can have a size equal to or greater than a size of an area for a plurality of sub-pixels SP. For example, one touch electrode (TE, unit touch electrode) may have a size several times to several hundred times greater than one sub-pixel SP.

A size ratio between a touch electrode TE and a sub-pixel SP can be adjusted based on a consideration of all of touch-sensing efficiency or capability, or an effect of touch sensing on display.

Also, one touch electrode TE can be a single lump electrode (bulk electrode).

The single lump electrode corresponding to one touch electrode TE can be a plane electrode without an opening or can be an electrode with one or more openings.

Otherwise, a plurality of sub-electrodes can be aligned in a mesh shape and electrically connected to each other so as to constitute one touch electrode TE.

Alternatively, a plurality of sub-electrodes can be aligned in a line shape and electrically connected to each other so as to constitute one touch electrode TE.

As such, the touch electrodes TE can be designed into various shapes and sizes. Each touch electrode TE illustrated in FIG. 1 may be understood as a unit area capable of touch driving and touch sensing.

Meanwhile, the touch display device 100 can be a display device of various types, such as a liquid crystal display (LCD) device, an organic light emitting display (OLED) device, etc., in terms of the display function.

If the touch display device 100 is a liquid crystal display device, the plurality of touch electrodes TE can function as a common electrode to which a common voltage is applied. If the touch display device 100 performs time-division driving, the common voltage may be applied to all of the plurality of touch electrodes TE during the display section. The touch driving signal TDS may be applied to at least one of the plurality of touch electrodes TE during the touch section.

If the touch display device 100 performs simultaneous driving, the touch driving signal TDS serving as a common voltage can be applied to all of the touch electrodes TE during an overlap section between the display section and the touch section.

Meanwhile, even if the plurality of touch electrodes TE is simultaneously driven by the touch driving circuit 140 (i.e., even if the touch driving signal TDS is applied to all of the touch electrodes TE), the touch processor 150 obtains a touch or non-touch and/or touch coordinates by individually using the signal TSS received from each touch electrode TE.

As described above, if the plurality of touch electrodes TE also functions as the common electrode to which the common voltage for displaying an image is applied, the plurality of touch electrodes TE can be electrically connected to each other inside or outside the touch driving circuit 140.

Figure 2:
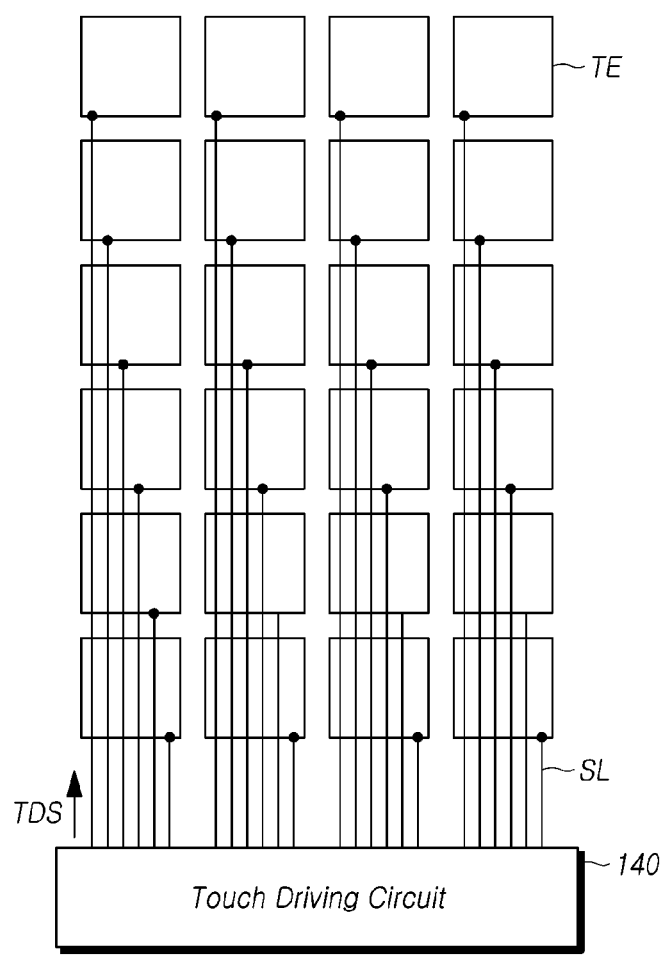
FIG. 2 is a diagram illustrating a plurality of touch electrodes and signal lines disposed in a display panel of the touch display device according to an aspect of the present disclosure.

FIG. 2 is a diagram illustrating a touch screen panel TSP provided within a display panel 110 of the touch display device 100 according to an aspect of the present disclosure (e.g., a diagram illustrating a plurality of touch electrodes TE and signal lines SL disposed in the display panel 110). Herein, a self-capacitance-based touch sensing structure will be described as an example.

Referring to FIG. 2, in the display panel 110, a plurality of signal lines SL configured to electrically connect the plurality of touch electrodes TE and the touch driving circuit 140 can be disposed.

In the self-capacitance-based touch sensing structure, the plurality of touch electrodes TE are not overlapped with each other, and are not electrically connected to each other at least in the touch period (touch section) within the display panel 110.

Further, in the display section, for example, the plurality of touch electrodes TE can be electrically connected to the touch driving circuit 140 and thus can be applied with a common voltage.

Also, the plurality of signal lines SL are not overlapped with each other, and are not electrically connected to each other at least in the touch section within the display panel 110.

Furthermore, in the display section, for example, the plurality of signal lines SL can be electrically connected within the touch driving circuit 140 and thus can be applied with a common voltage.

The plurality of touch electrodes TE and the plurality of signal lines SL can be disposed on the same layer or different layers.

If the plurality of touch electrodes TE and the plurality of signal lines SL are disposed on the same layer, the plurality of signal lines SL are disposed in an area where the plurality of touch electrodes TE are not.

If the plurality of touch electrodes TE and the plurality of signal lines SL are disposed on different layers, the plurality of signal lines SL can be disposed in an area where the plurality of touch electrodes TE are not disposed or can be disposed in an area where the plurality of touch electrodes TE are disposed.

Figure 3:
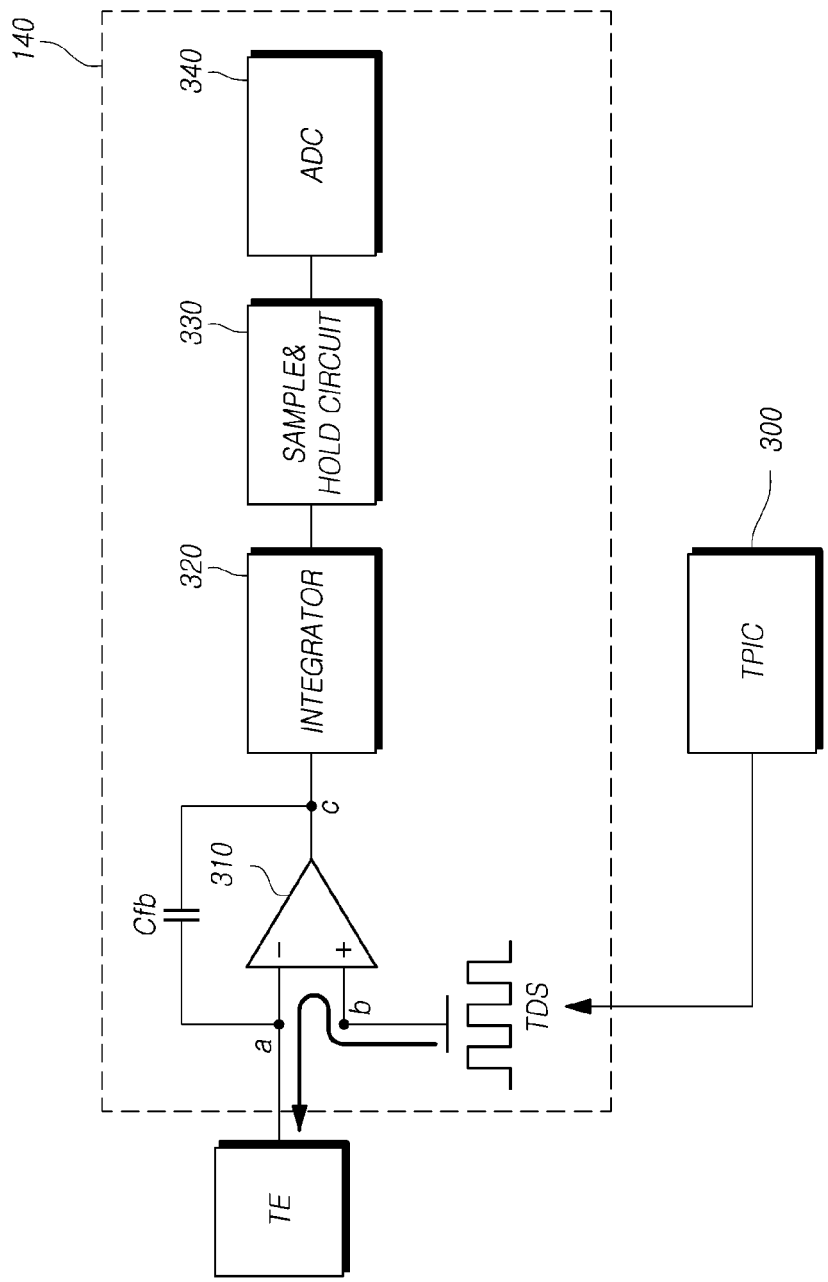
FIG. 3 is a diagram illustrating a touch driving circuit of the touch display device according to an aspect of the present disclosure.

FIG. 3 is a diagram illustrating a touch driving circuit 140 of the touch display device 100 according to an aspect of the present disclosure.

Referring to FIG. 3, the touch driving circuit 140 can include an amplifier 310, an integrator 320, a sample and hold circuit 330, and an analog to digital converter (ADC) 340.

The amplifier 310 can include a first terminal b into which the touch driving signal TDS is input from a touch power integrated circuit (TPIC) 300, a second terminal a from which the touch driving signal TDS input into the first terminal b is output to the touch electrode TE, and a third terminal c from which a signal in response to a change in capacitance between a user's touch object (e.g., finger, pen, etc.) and the touch electrode TE is output.

The integrator 320 can integrate signals output from the third terminal c of the amplifier 310 so as to output an integrated value.

The sample and hold circuit 330 can store the integrated value (integrated signal) output by the integrator 320.

The ADC 340 can convert the integrated value stored in the sample and hold circuit 330 into a sensing value corresponding to a digital value and then output the sensing value.

Since the touch driving signal TDS applied to the touch electrode TE is applied by the amplifier 310, a capacitor can be formed between the touch electrode TE and the touch object depending on a touch or non-touch.

When the capacitor is formed, the capacitor is charged with charges so as to correspond to a feedback capacitor Cfb connected to the second terminal a and the third terminal c of the amplifier 310. The amount of charges to be charged can be changed depending on a touch.

The integrator 320 integrates the signals output from the amplifier 310 for a desired (and/or alternatively, predetermined) number of times and then outputs an integrated signal. The sample and hold circuit 330 samples and stores the signal output from the integrator 320.

The ADC 340 reads the signal stored in the sample and hold circuit 330, converts the signal into a sensing value corresponding to a digital value, and then outputs the sensing value to the touch processor 150.

The touch processor 150 determines (calculates) a touch or non-touch and/or touch coordinates on the basis of sensing values.

The amplifier 310 and the integrator 320 can be collectively referred to as an analog front end (AFE).

Figure 4:
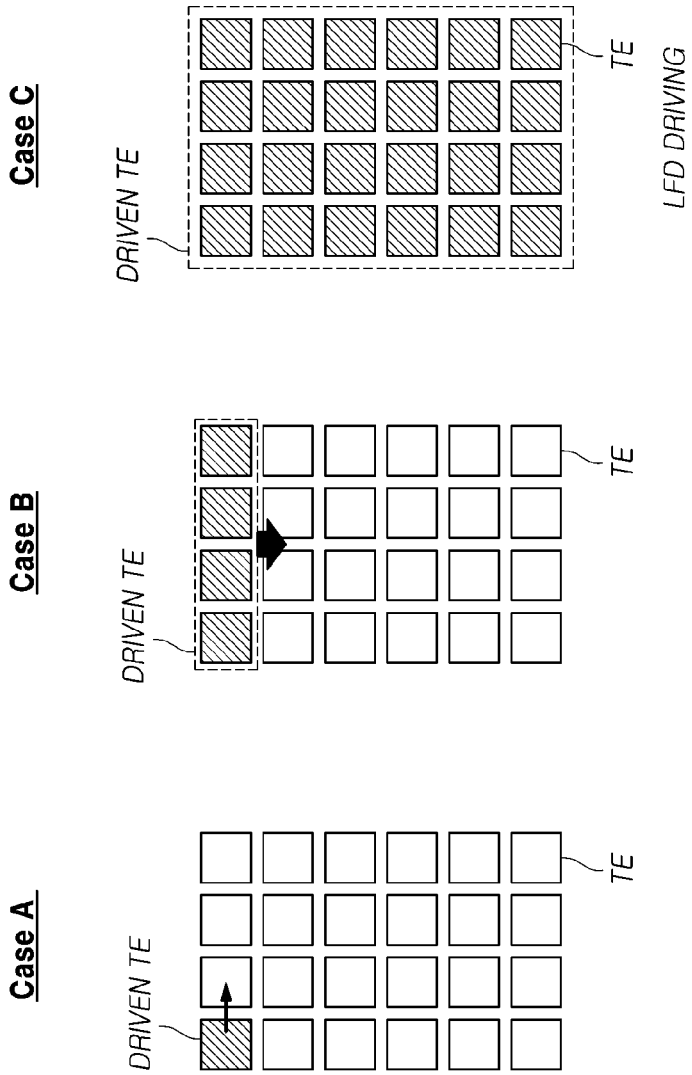
FIG. 4 is a diagram illustrating a touch driving method according to an aspect of the present disclosure.

FIG. 4 is a diagram illustrating a touch driving method according to an aspect of the present disclosure. Herein, it is assumed that twenty-four touch electrodes TE are disposed in six rows and four columns in the display panel 110.

Referring to FIG. 4, the touch driving circuit 140 can drive only one touch electrode TE as shown in Case A or a plurality of touch electrodes TE as shown in Case B at a certain point of time.

In Case A, a multiplexer configured to select one of twenty-four touch electrodes TE is needed, and the multiplexer corresponds to an analog front end (AFE).

In Case B, four touch electrodes of twenty-four touch electrodes TE are grouped into a group and driven simultaneously. In this case, each of the four touch electrodes TE driven simultaneously is electrically connected to a multiplexer. Herein, each of four multiplexers corresponds to an analog front end (AFE). Therefore, each of the four multiplexers is connected to one of four touch electrodes TE included in the corresponding group, and the touch driving signal TDS can be simultaneously applied to the four touch electrodes TE.

In Case A and Case B, only the touch electrode TE as a touch sensing target is driven.

In this case, when the touch driving signal TDS is applied to the touch electrode TE as a touch sensing target, there can be unnecessary voltage difference between the touch electrode TE as a touch sensing target and a touch electrode TE adjacent thereto. Therefore, a parasitic capacitance may be formed between the touch electrode TE as a touch sensing target and the touch electrode TE adjacent thereto.

The parasitic capacitance may cause an increase in a resistor-capacitor (RC) load formed in the touch electrode TE and also cause a change in a capacitance formed between the touch electrode TE and the touch object. Therefore, the touch sensitivity may be greatly decreased.

Therefore, the touch driving circuit 140 according to the present disclosure applies a signal identical or corresponding to the touch driving signal TDS to the touch electrode TE adjacent to the touch electrode TE as a touch sensing target when the touch driving signal TDS is applied to the touch electrode TE as a touch sensing target.

Accordingly, a voltage difference between the touch electrode TE as a touch sensing target and the touch electrode TE adjacent thereto is eliminated, so that it is possible to suppress the formation of an unnecessary parasitic capacitance.

Application of a signal identical or corresponding to the touch driving signal TDS to the touch electrode TE adjacent to the touch electrode TE as a touch sensing target in order to suppress the formation of a parasitic capacitance between the touch electrode TE as a touch sensing target and the touch electrode TE adjacent thereto, is referred to as load free driving (hereinafter, also referred to as a LFD signal).

Further, the signal applied to the touch electrode TE adjacent to the touch electrode TE as a touch sensing target is identical or corresponding to the touch driving signal TDS and referred to as a load free driving signal. The touch driving signal TDS can also be referred to as a load free driving signal.

During the load free driving, the load free driving signal can be applied only to some touch electrodes TE adjacent to the touch electrode TE acting as a touch sensing target or can be applied to all of the touch electrodes TE.

In Case C, the touch driving signal TDS is applied to all of the plurality of touch electrodes TE disposed in the display panel 110 at a certain point of time.

In this case, one or more of the plurality of touch electrodes TE may be touch electrodes TE as a target of a touch sensing process and the rest of the touch electrodes TE may be touch electrodes TE as a load free driving target.

Meanwhile, when the touch driving signal TDS is applied to the touch electrode TE as a touch sensing target, the touch driving circuit 140 can apply the signal (load free driving signal) identical or corresponding to the touch driving signal TDS to a gate line GL adjacent to the touch electrode TE as a touch sensing target or to all of the gate lines GL.

Accordingly, it is possible to suppress the formation of a parasitic capacitance between the touch electrode TE and the gate line GL.

Further, when the touch driving signal TDS is applied to the touch electrode TE as a touch sensing target, the touch driving circuit 140 can apply the signal (load free driving signal) identical or corresponding to the touch driving signal TDS to a data line DL adjacent to the touch electrode TE as a touch sensing target or to all of the data lines DL.

Accordingly, it is possible to suppress the formation of a parasitic capacitance between the touch electrode TE and the data line DL.

Figure 5:
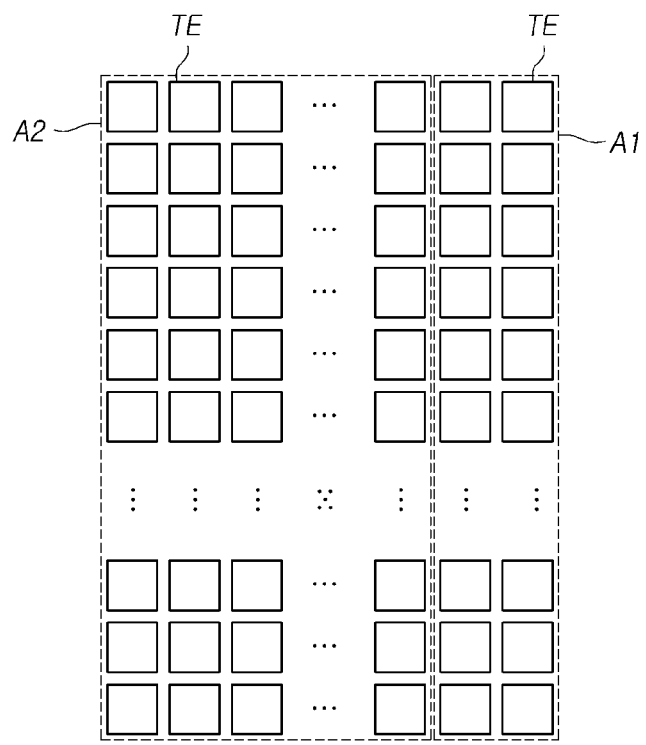
FIG. 5 is a diagram illustrating two kinds of areas in the display panel according to an aspect of the present disclosure.

FIG. 5 is a diagram illustrating two kinds of areas A1 and A2 in the display panel 110 according to an aspect of the present disclosure.

Referring to FIG. 5, the display panel 110 can include at least one first area A1 and at least one second area A2.

In a normal state, all of the first area A1 and the second area A2 correspond to a touch sensing area and display area.

That is, in a normal state, the entire area of the display panel 110 corresponds to a touch sensing area and display area.

In a specific event, the second area A2 of the display panel 110 can become a non-touch sensing area and the first area A1 of the display panel 110 can become a touch sensing area.

Also, in the specific event, the second area A2 of the display panel 110 can become a non-display area and the first area A1 of the display panel 110 can become a display area as well as a touch sensing area.

The specific event is an event for allowing only the first area A1 of the display panel 110 to be a touch sensing area.

For example, when the display panel 110 is covered by an object (e.g. case cover, etc.), the touch display device 100 can recognize that the specific event has occurred.

As another example, when only the second area A2 except for the first area A1 of the display panel 110 is covered by any object (e.g. case cover, etc.), the touch display device 100 can recognize that the specific event has occurred.

As another example, when the entire area of the display panel 110 is covered by a cover (e.g. cover case, etc.), and the portion covering the first area A1 in the cover is transparent and the portion covering the second area A2 in the cover is opaque, the touch display device 100 can recognize that the specific event has occurred.

As another example, when the entire area of the display panel 110 is covered by a cover (e.g. a cover case etc.), and the portion of the cover covering the first area A1 is made of a material which does not interfere with the capacitance formation between the touch screen panel TSP and the finger, the portion of the cover covering the second area A2 is made of a material which interferes with capacitance formation between the touch screen panel TSP and the finger, the touch display device 100 can recognize that the specific event has occurred.

In another example, the specific event can refer to a situation in which a portion of the display panel 110 can display a video and during such display, constitute a non-touch section (portion, area, etc.) so that no touch input provided in this portion would be sensed. At the same time another portion of the display panel 110 can be identified as the touch sensing area (portion, area, etc.) for sensing a touch. Accordingly, in one example, the specific event is defined as a playback of a video on a portion of the display panel 110.

In another example, if the touch display device 100 is a mobile device such as a smart phone, when the display panel 110 is covered by a cover case configured to differentiate a covering state for one or more first areas A1 (e.g., a non-covered state, a covering state available for touch sensing or a transparent covering state) from a covering state for one or more second areas A2 (e.g., a covered state, a cover state unavailable for touch sensing, or an opaque covering state), the touch display device 100 may recognize that a specific event occurs.

In another example, when the touch display device 100 senses a touch of a human body (e.g., palm, arm, etc.) except a finger on the display panel 110 in a pen touch sensing mode for sensing a position of a pen or recognizing information (data) about the pen, the touch display device 100 may recognize that a specific event occurs. For example, if a part of body larger in size than the finger (e.g., a human's ear or one side of human's face when a mobile device is held close to the face) is in contact with the display panel 110, this can be recognized as the occurrence of a specific event.

If the occurrence of a specific event is recognized, the touch display device 100 may assign the area where the touch of the human body (e.g., palm, arm, etc.) except the finger is sensed as one or more second areas A2 and exclude the one or more second areas A2 from a touch sensing area, and may assign the other area except the one or more second areas A2 as a first area A1 corresponding to the touch sensing area. Herein, the touch sensing area may refer to an area for sensing a touch or non-touch of a finger or a touch position or may refer to an area for sensing a position or tilt of a pen or receiving pen data about the pen.

In another example, when an image is displayed only on a part of the screen, the touch display device 100 may recognize that a specific event occurs. Therefore, the touch display device 100 may assign the partial area where the image is displayed as a second area A2 unavailable for touch sensing, and may assign the other area except the second area A2 as a first area A1 corresponding to a touch sensing area. This may relate to a multi-task function that enables a user to use another application while watching images.

In another example, when there is an input corresponding to a screen lock button image that makes it impossible to touch a screen displaying a movie, music, a photo, a TV program, etc., the touch display device 100 may recognize that a specific event occurs. Therefore, the touch display device 100 may assign the area where the screen lock button image is displayed as a first area A1 corresponding to a touch sensing area, and may exclude a second area A2 including the image playing screen from the touch sensing area. This may relate to a function for suppressing the occurrence of an unnecessary touch while watching images.

In another example, when a specific application is active and currently running on the touch display device 100, the touch display device 100 may recognize that a specific event occurs. For example, when an application for an electronic book, magazine, newspaper, etc., is being used such that text of the electronic book, magazine, newspaper, etc., is being shown on the touch display device 100 (e.g., on touch screen panel 110), an area of touch screen panel 110 on which the text is shown is assigned as second area A2 corresponding to a non-touch sensing area unavailable to touch sensing, while other area(s) (e.g., one or more area surrounding the second area A2 is assigned as a touch sensing area for sensing a touch.

In addition to the above-described examples of the specific event, various situations in which only a part of the entire screen cannot sense a touch or various situations in which a part of the entire screen is driven in a different manner may be defined in advance as specific events. Further, one or more of a position, number, and size of each of the first area A1 and the second area A2 can be modified in various ways depending on the user's use situation or system driving environment.

The above specific events are examples only and the present disclosure is not limited thereto.

Figure 6:
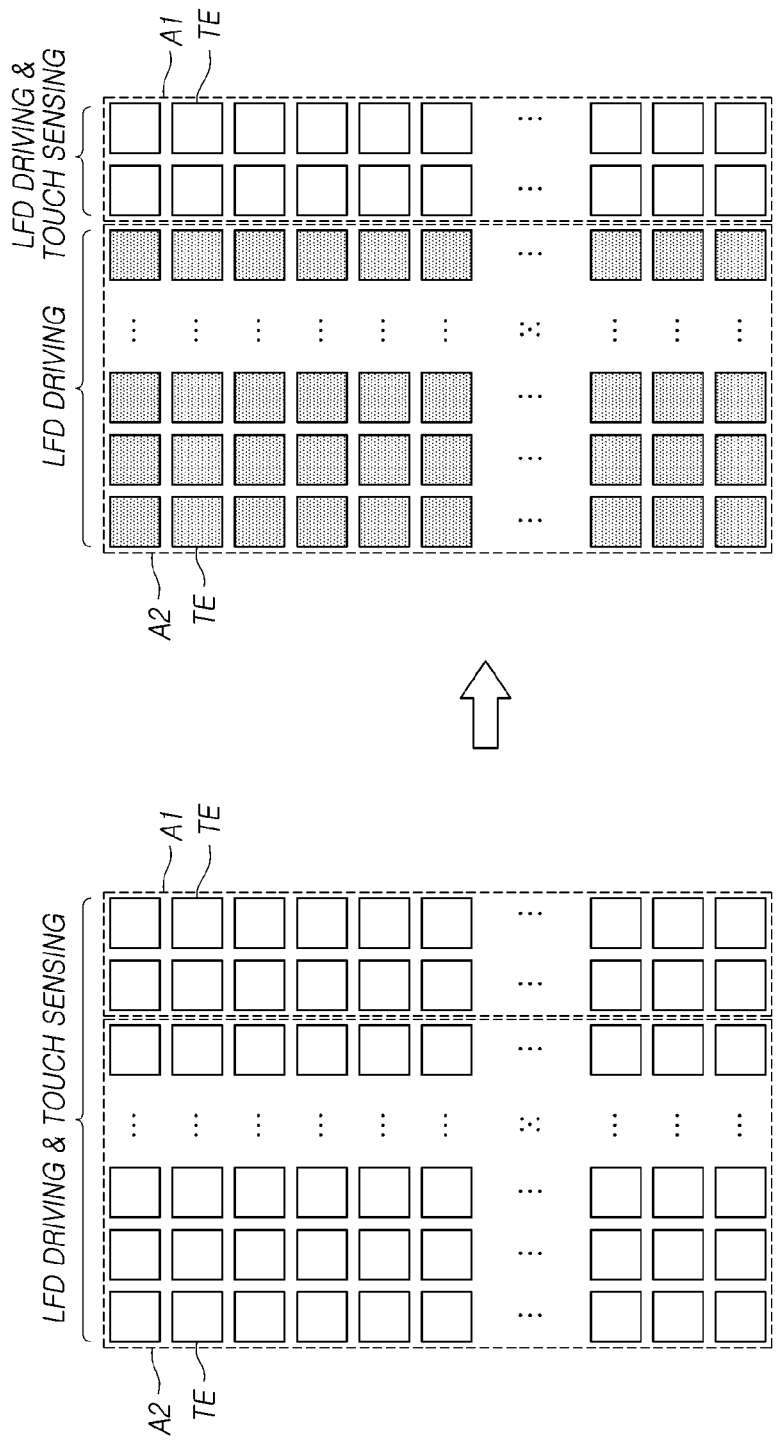
FIG. 6 is a diagram provided to explain a first driving method for sensing a touch on a partial area in case of a specific event in the touch display device according to an aspect of the present disclosure.

FIG. 6 is a diagram provided to explain a first driving method for sensing a touch on the first area A1 as a part of the display panel 110 in case of a specific event in the touch display device 100 according to an aspect of the present disclosure.

Referring to FIG. 6, the touch driving circuit 140 can perform load free driving (LFD driving) to all of the touch electrodes TE.

In this case, before a specific event occurs (e.g., one of the first specific event and/or the second specific event defined above), all of the touch electrodes TE can be driven at a certain point of time as the touch section for touch sensing (which can be different from or can overlap with the display section).

That is, all of the areas A1 and A2 of the display panel 110 correspond to an area where touch driving (LFD driving) for touch sensing is performed.

Also, before the specific event occurs, a touch or non-touch and/or touch coordinates are detected from all of the areas A1 and A2 of the display panel 110.

That is, all of the areas A1 and A2 of the display panel 110 correspond to a touch sensing area.

When, for example, the first specific event occurs, a touch sensing process of detecting a touch or non-touch and/or touch coordinates using only a signal received through a touch electrode TE disposed in the first area A1 of the display panel 110 can be performed.

That is, in case of the first specific event example, one or more first areas A1 of the display panel 110 corresponds to a touch sensing area and one or more second areas A2 of the display panel 110 does not correspond to a touch sensing area.

As described above, in case of the first specific event example, if only the first area A1 of the display panel 110 corresponds to a touch sensing area, the touch display device 100 can drive the plurality of touch electrodes TE by a first driving method in which all of the first area A1 and the second area A2 of the display panel 110 are LFD driving areas.

In other words, in the first driving method of the touch display device 100, a signal identical or corresponding to the touch driving signal TDS can be applied to the touch electrodes TE disposed in all of the first area A1 and the second area A2 of the display panel 110.

Herein, the LFD driving area refers to an area to which the signal (load free driving signal), identical or corresponding to the touch driving signal TDS, is applied. Accordingly, touch driving signal TDS can be regarded as being included in the load free driving signal.

Figure 7:
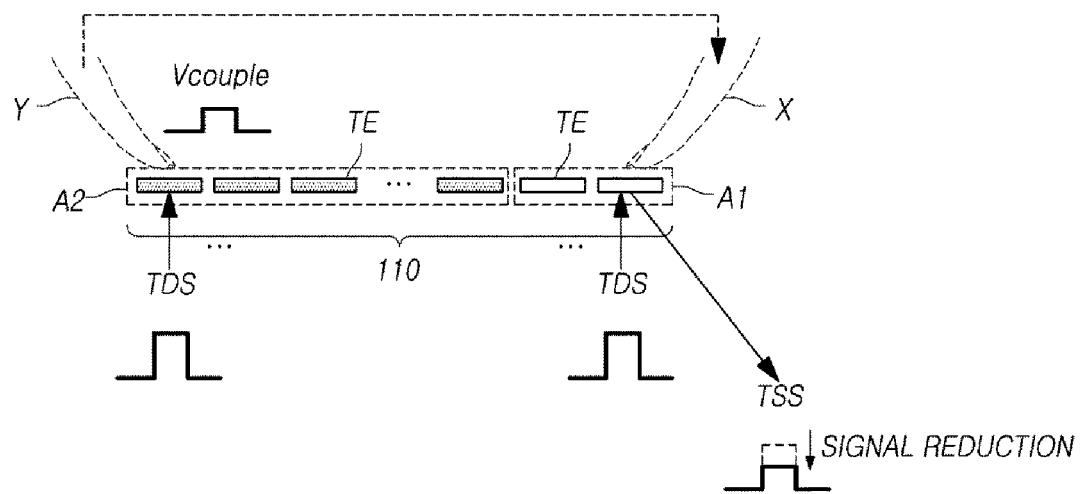
FIG. 7 through FIG. 9 are diagrams provided to explain a touch sensitivity decrease caused by the first driving method for sensing a touch on a partial area in case of a specific event in the touch display device according to an aspect of the present disclosure.
Figure 8:
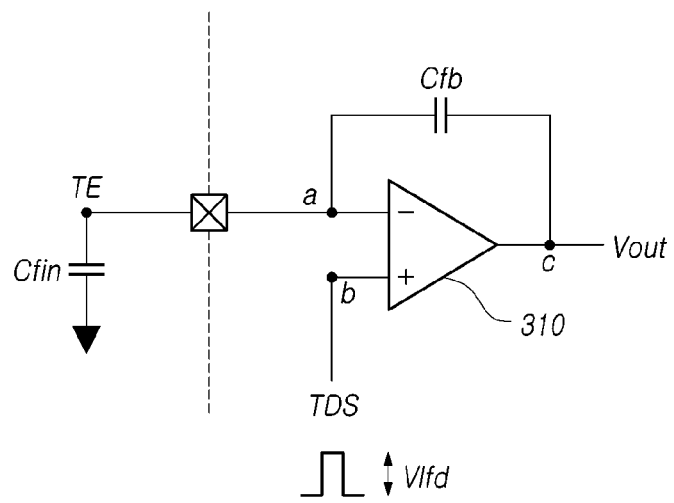
Figure 9:
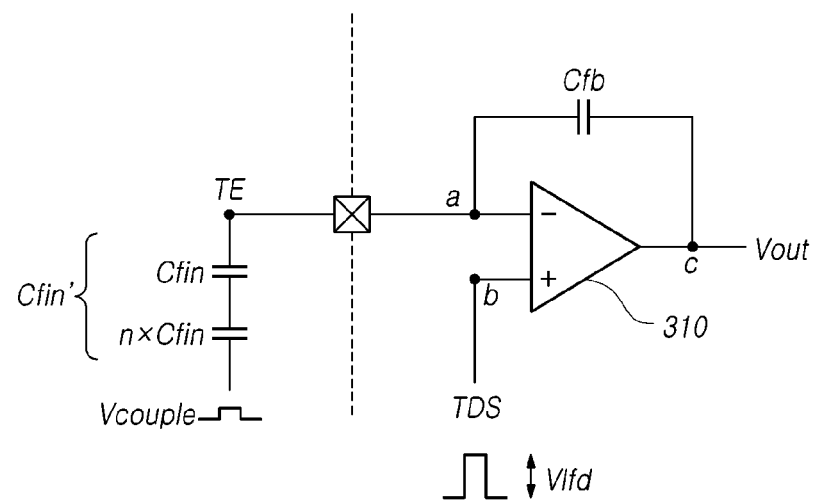

FIG. 7 through FIG. 9 are diagrams provided to explain a touch sensitivity decrease caused by the first driving method for sensing a touch on the first area A1 as a part of the display panel 110 in case of a specific event in the touch display device 100 according to an aspect of the present disclosure.

FIG. 7 illustrates that a user substantially and intentionally touches the first area A1 while holding the second area A2 of the display panel 110.

FIG. 8 illustrates a schematic circuit modeling a status where the user touches only the first area A1 without holding the second area A2 of the display panel 110, and FIG. 9 illustrates a schematic circuit modeling a status where the user substantially and intentionally touches the first area A1 while holding the second area A2 of the display panel 110.

Referring to FIG. 7 and FIG. 8, in case of a specific event (e.g., the first specific event described above), the touch display device 100 can sense a touch only in the first area A1 of the display panel 110. If LFD driving is performed in the entire area A1 and A2 of the display panel 110 and a user touches only the first area A1 of the display panel 110 with a finger X on the right hand, a touch electrode TE positioned in the first area A1 and applied with the touch driving signal TDS can form a capacitance Cfin together with the finger X on the user's right hand.

Accordingly, a variation ΔVout in signal output from the third terminal c of the amplifier 310 can be represented by the following Equation 1.

$$\Delta Vout=[(Cfin/Cfb)*Vlfd] \qquad \text{Eq. (1)}$$

In Equation 1, ΔVout is a variation in signal output from the third terminal c of the amplifier 310, Cfin is a capacitance formed between the finger X on the user's right hand touching the first area A1 and the touch electrode TE in the first area A1, Cfb is a feedback capacitance, and Vlfd is an amplitude (voltage) of the touch driving signal TDS.

Referring to FIG. 7 and FIG. 9, in case of the first specific event example, the touch display device 100 can sense a touch only in the first area A1 of the display panel 110. If LFD driving is performed in the entire area A1 and A2 of the display panel 110 and a user substantially and intentionally touches the first area A1 with the finger X on the right hand while holding the second area A2 of the display panel 110 with the left hand Y, n (n is a natural number of 1 or more) number of touch electrodes TE positioned in the second area A2 of the display panel 110 may form a capacitance Cfin together with the user's left hand Y. Due to the LFD driving, the touch driving signal TDS corresponding to the load free driving signal may be applied.

Accordingly, referring to FIG. 7 and FIG. 9, a coupling voltage Vcouple may be induced to the user's left hand Y holding the second area A2 of the display panel 110.

Further, the sum of capacitances formed between the n number of touch electrodes TE in the second area A2 of the display panel 110 and the user's left hand Y is equal to n*Cfin.

The coupling voltage Vcouple induced to the user's left hand Y holding the second area A2 of the display panel 110 may be transferred to the finger X of the user's right hand.

Accordingly, there can be a change in voltage difference between the touch electrode TE positioned in the first area A1 of the display panel 110, corresponding to a touch sensing target and applied with the touch driving signal TDS for touch sensing and the finger X of the user's right hand.

Therefore, the intensity of the signal TSS received through the touch electrode TE positioned in the first area A1 of the display panel 110 and corresponding to a touch sensing target is reduced. This signal reduction can cause a decrease in touch sensitivity.

As described above, referring to FIG. 7 and FIG. 9, in case of the specific event example, the touch display device 100 can sense a touch only in the first area A1 of the display panel 110. If LFD driving is performed in the entire area A1 and A2 of the display panel 110 and a user substantially and intentionally touches the first area A1 with the finger X on the right hand while holding (touching) the second area A2 of the display panel 110 with the left hand Y, the total capacitance C'fin (as the sum of a capacitance Cfin between the finger X touching the first area A1 and the touch electrode TE in the first area A1) and a capacitance n*Cfin (between the finger X on the right hand while holding (touching) the second area A2 and the n number of touch electrodes TE in the second area A2) may be formed.

Accordingly, a variation ΔVout in signal output from the third terminal c of the amplifier 310 can be represented by the following Equation 2.

$$\Delta Vout=[Cfin'/Cfb)*Vlfd]-[(Cfin'/Cfb)*Vcouple] \qquad \text{Eq. (2)}$$

In Equation 2, ΔVout is a signal output from the third terminal c of the amplifier 310 and Vcouple is a coupling voltage coupled to the user's left hand Y touching the user's second hand Y by the touch electrode TE applied with the touch driving signal TDS corresponding to the load free driving signal due to LFD driving to the second area A2. Vlft may be an amplitude (voltage) of the touch driving signal TDS. Cfb is a feedback capacitance. Also, Cfin' is the total capacitance formed between the user and the touch electrode TE in a state where the user holds (touches) the second area A2 of the display panel 110 while substantially and unintentionally touching the first area A1 with the finger X on the right hand.

In Equation 2, [(Cfin'/Cfb)*Vlfd] corresponds to touch sensitivity to a touch on the first area A1 and [(Cfin'/Cfb) *Vcouple] corresponds to touch sensitivity to a touch on the second area A2.

As described above, in case of the first specific event example, if the touch display device 100 senses a touch only in the first area A1 of the display panel 110, touch sensitivity can be increased.

However, according to the first driving method of performing LFD driving in the entire area A1 and A2 of the display panel 110, even if touch sensing is performed only in the first area A1 of the display panel 110, when the first area A1 and the second A2 of the display panel 110 are simultaneously touched, touch sensitivity in the first area A1 of the display panel may be decreased due to LFD driving in the second area A2 of the display panel 110.

Hereinafter, in order to reduce this disadvantage, a second driving method is described where, in case of the specific event (e.g., the first specific event), when a touch is sensed only in the first area A1 of the display panel 110, LFD driving (application of a touch driving signal) is performed only with respect to the first area A1 of the display panel 110.

Figure 10:
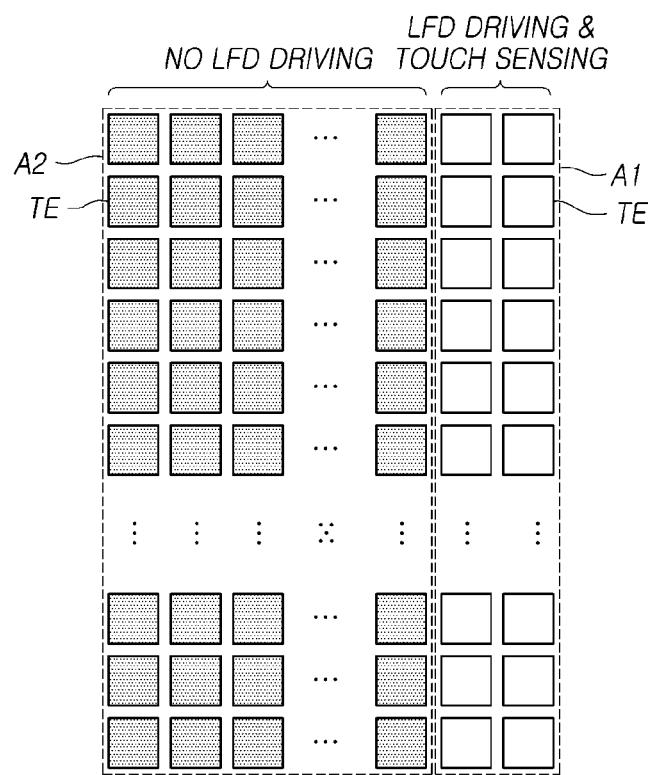
FIG. 10 is a diagram provided to explain a second driving method for sensing a touch on a partial area in case of a specific event in the touch display device according to an aspect of the present disclosure.
Figure 11:
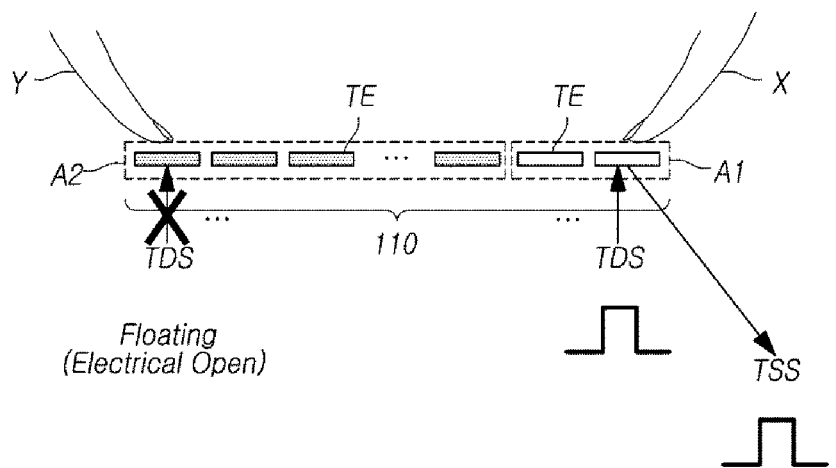
FIG. 11 is a diagram illustrating a first technique for applying the second driving method for sensing a touch on a partial area in case of a specific event in the touch display device according to an aspect of the present disclosure.
Figure 12:
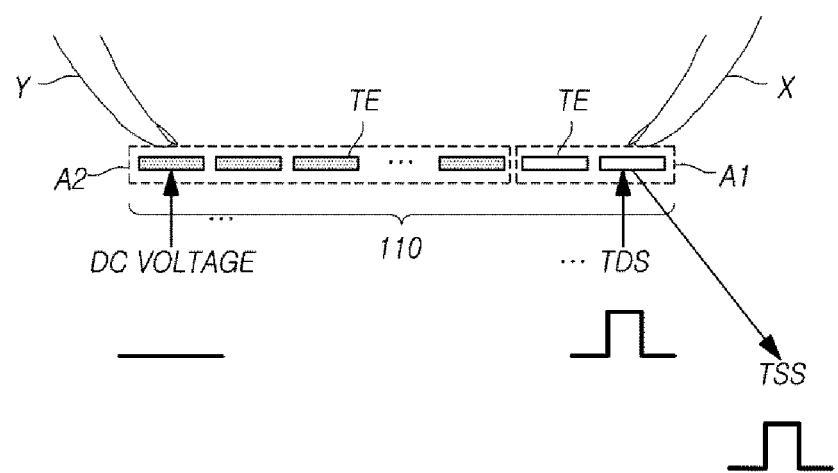
FIG. 12 is a diagram illustrating a second technique for applying the second driving method for sensing a touch on a partial area in case of a specific event in the touch display device according to an aspect of the present disclosure.

FIG. 10 is a diagram provided to explain a second driving method for sensing a touch on a partial area in case of a specific event in the touch display device 100 according to an aspect of the present disclosure. FIG. 11 is a diagram illustrating a first technique for applying the second driving method for sensing a touch on a partial area in case of a specific event in the touch display device 100 according to an aspect of the present disclosure. FIG. 12 is a diagram illustrating a second technique for applying the second driving method for sensing a touch on a partial area in case of a specific event in the touch display device 100 according to an aspect of the present disclosure.

The touch driving circuit 140 of the touch display device 100 can output the touch driving signal TDS to some or all of the plurality of touch electrodes TE in a touch sensing section (also simply referred to as a "touch section").

Referring to FIG. 10, if there occurs an event in which the first area A1 corresponding to a part of the touch screen panel 110 is set as a touch sensing area, LFD driving (touch driving) may be performed for touch electrode(s) TE corresponding to the first area A1 and LFD driving (touch driving) may not be performed for touch electrode(s) TE corresponding to the second area A2 or the touch electrode TE corresponding to the second area A2 may be driven differently from the touch electrode TE corresponding to the first area A1 during the touch sensing section.

For example, in case of the first specific event described above, the touch driving signal TDS is output to one or more touch electrodes TE positioned in one or more first areas A1. Then, a signal different from the touch driving signal TDS may be output to one or more touch electrodes TE positioned in one or more second areas A2, or one or more touch electrodes TE positioned in one or more second areas A2 can be in an electrically open state.

During the touch sensing section, the signal applied to the touch electrodes TE in the second areas A2 may be different from the touch driving signal TDS applied to the touch electrodes TE in the first areas A1 in that at least one signal property (e.g., an amplitude, a phase, a voltage polarity, and a frequency) of the signal applied to the touch electrodes TE in the second areas A2 is different from the corresponding signal property (e.g., a corresponding amplitude, a corresponding phase, a corresponding voltage polarity, and a corresponding frequency) of the touch driving signal TDS.

Referring to FIG. 11, in case of the first specific event described above, while the touch driving signal TDS is output to all of touch electrodes TE positioned in the first area A1, all of touch electrodes TE positioned in the second area A2 may be in a floating state as being electrically open.

Referring to FIG. 12, in case of the first specific event described above, while the touch driving signal TDS is output to all of touch electrodes TE in the first area A1, all of touch electrodes TE positioned in the second area A2 may be applied with a DC voltage which is a signal different from the pulse-type touch driving signal TDS.

Herein, the DC voltage to be applied to the touch electrodes TE in case of a specific event can be, for example, a ground voltage or a common voltage Vcom or can also be a predetermined specific voltage.

According to the above description, signal reduction of the signal TSS received through the touch electrode TE positioned in the first area A1 does not occur, so that the touch sensitivity can be improved.

In other words, in the touch sensing section in which a touch is sensed only in the first area A1, it is possible to suppress a decrease in touch sensitivity in the first area A1 of the display panel 110 due to LFD driving (touch driving) in the second area A2 of the display panel 110 by suppressing application of a signal (identical or similar to the touch driving signal) relevant to touch driving to the touch electrode TE disposed in the second area A2.

Meanwhile, after the specific event occurs, if the touch electrode TE disposed in the second area A2 is applied with the DC voltage or floated in the touch sensing section (touch section), the data line and/or the gate line can be applied with the DC voltage or floated.

Figure 13:
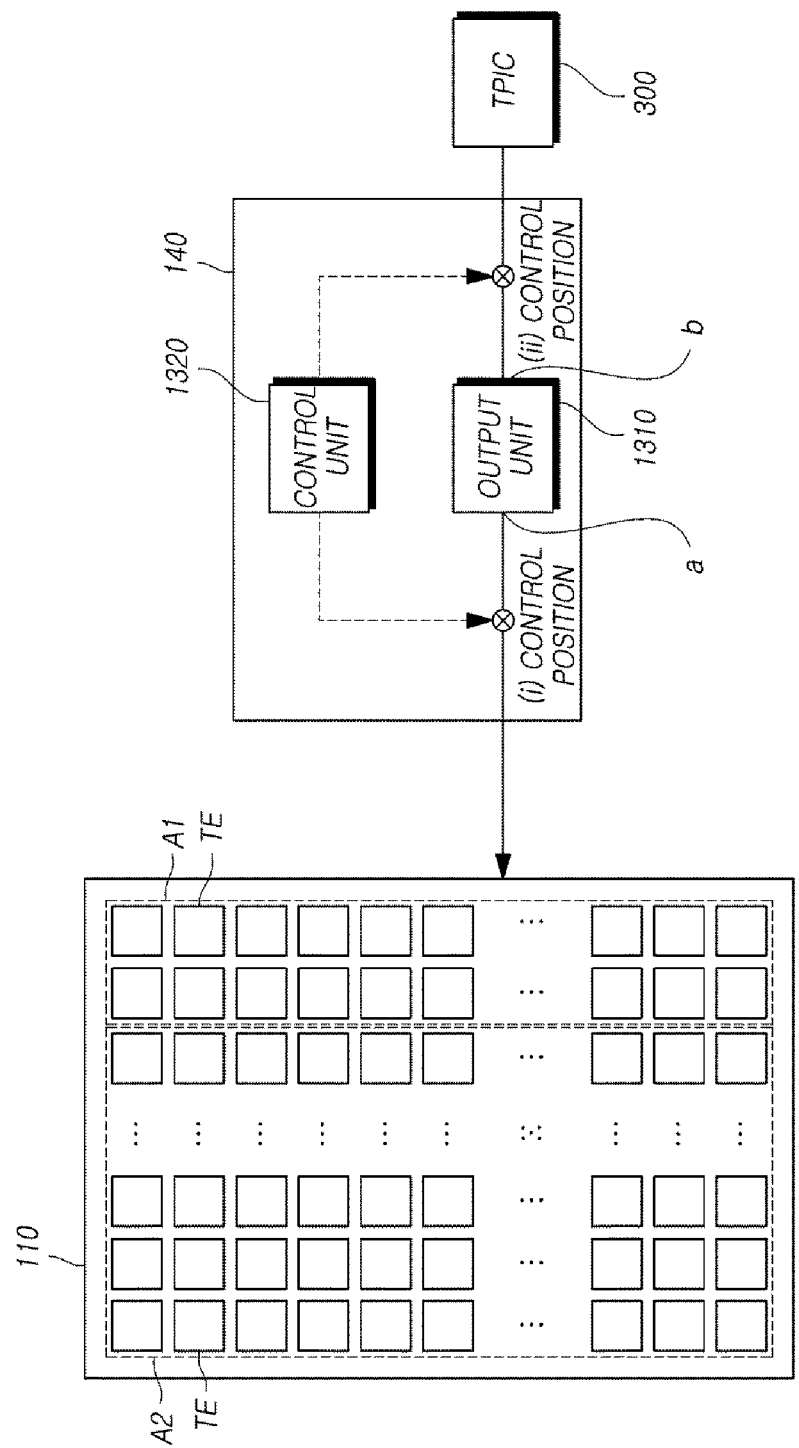
FIG. 13 is a diagram illustrating the touch driving circuit for the second driving method for sensing a touch on a partial area in case of a specific event in the touch display device according to an aspect of the present disclosure.

FIG. 13 is a diagram illustrating the touch driving circuit 140 for the second driving method for sensing a touch on a partial area in case of a specific event in the touch display device 100 according to an aspect of the present disclosure.

Referring to FIG. 13, the touch driving circuit 140 can include an output unit 1310 configured to output the input touch driving signal TDS to some or all of the plurality of touch electrodes TE in the touch sensing section and a control unit 1320 configured to (1) control a signal different from the touch driving signal TDS to be output to a touch electrode TE corresponding to the second area A2 or (2) control the touch electrode TE corresponding to the second area A2 to be in an electrically open state and (3) control the touch driving signal TDS to be output to a touch electrode TE corresponding to the first area A1 in a touch sensing section if there occurs an event in which the touch screen panel TSP or the first area A1 as a part of the touch screen built-in display panel 110 is set as a touch sensing area.

If the above-described touch driving circuit 140 is used, in the touch sensing section in which a touch is sensed only in the touch screen panel TSP or the first area A1 as a part of the touch screen built-in display panel 110, LFD driving may be performed in the first area A1 as a touch sensing area but LFD driving may not be performed in the second area A2 as a non-touch sensing area. Thus, it is possible to suppress an unnecessary decrease in touch sensitivity in the first area A1.

In the above-described touch driving circuit 140, the output unit 1310 may be implemented including the amplifier 310 illustrated in FIG. 3 or the like, and the control unit 1320 may be implemented as one or more switches.

A control position (control point) of the control unit 1320 may be an output point a at which the touch driving signal TDS is output from the output unit 1310 or an input point b at which the touch driving signal TDS is input into the output unit 1310 from the TPIC 300 that supplies the touch driving signal TDS.

A control technique of the control unit 1320 includes a first technique in which the output point a at which the touch driving signal TDS is output from the output unit 1310 or the input point b at which the touch driving signal TDS is input into the output unit 1310 is electrically opened, and a second technique in which the output point a at which the touch driving signal TDS is output from the output unit 1310 or the input point b at which the touch driving signal TDS is input into the output unit 1310 is connected to a DC voltage node.

The above-described touch driving circuit 140 will be described in detail with reference to FIG. 14 through FIG. 17.

Figure 14:
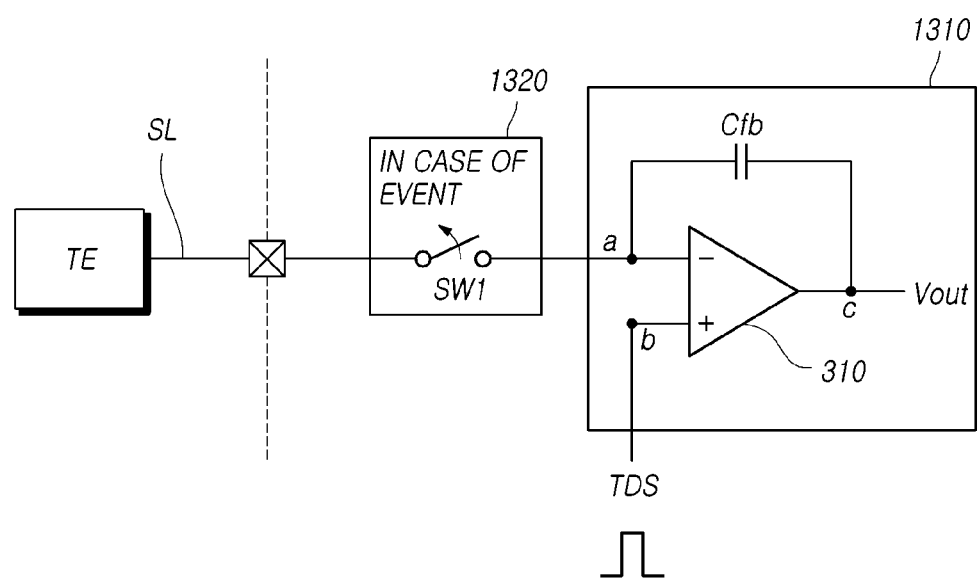
FIG. 14 through FIG. 17 show examples of the touch driving circuit for the second driving method for sensing a touch on a partial area in case of a specific event in the touch display device according to an aspect of the present disclosure.

FIG. 14 shows the touch driving circuit 140 for the second driving method for sensing a touch on a partial area in case of a specific event in the touch display device 100 according to an aspect of the present disclosure. FIG. 14 shows the touch driving circuit 140 in case where a control point of the control unit 1320 is the output point a at which the touch driving signal TDS is output from the output unit 1310 and a control technique of the control unit 1320 is the first technique (floating).

Referring to FIG. 14, in case where a control point of the control unit 1320 is the output point a at which the touch driving signal TDS is output from the output unit 1310 and a control technique of the control unit 1320 is the first technique, the control unit 1320 can be implemented including a first switch SW1 that controls whether or not to connect the output unit 1310 to the touch electrode TE.

Before an event (e.g., the first and/or the second event described above) occurs, the first switch SW1 can be turned on so as to connect the output unit 1310 to the touch electrode TE.

After the event occurs, the first switch SW1 can be turned off so as to disconnect the output unit 1310 from the touch electrode TE.

In other words, the first switch SW1 can control connection between the output point a at which the touch driving signal TDS is output in the touch driving circuit 140 and the signal line SL connected to the touch electrode TE.

The first switch SW1 can be turned on before the event occurs so as to electrically connect the point a at which the touch driving signal TDS is output in the touch driving circuit 140 to the signal line SL connected to the touch electrode TE. Also, the first switch SW1 can be turned off when the event occurs so as to disconnect the point a at which the touch driving signal TDS is output in the touch driving circuit 140 from the signal line SL connected to the touch electrode TE.

Referring to FIG. 14, the amplifier 310 included in the touch driving circuit 140 can be included in the output unit 1310.

The amplifier 310 includes the first terminal b into which the touch driving signal TDS is input, the second terminal a from which the touch driving signal TDS input into the first terminal b is output to the touch electrode TE, and the third terminal c from which a signal in response to a change in capacitance between the user's touch object and the touch electrode TE is output.

The first switch SW1 can be connected between the signal line SL connected to the touch electrode TE and the second terminal a corresponding to the point at which the touch driving signal TDS is output in the touch driving circuit 140.

According to the above description, in case of a specific event, by turning off the first switch SW1, it is possible to suppress the supply of the touch driving signal TDS for LFD driving to the touch electrode TE disposed in the second area A2. In this case, the touch electrode TE disposed in the second area A2 may be in a floating state as being electrically opened.

Figure 15:
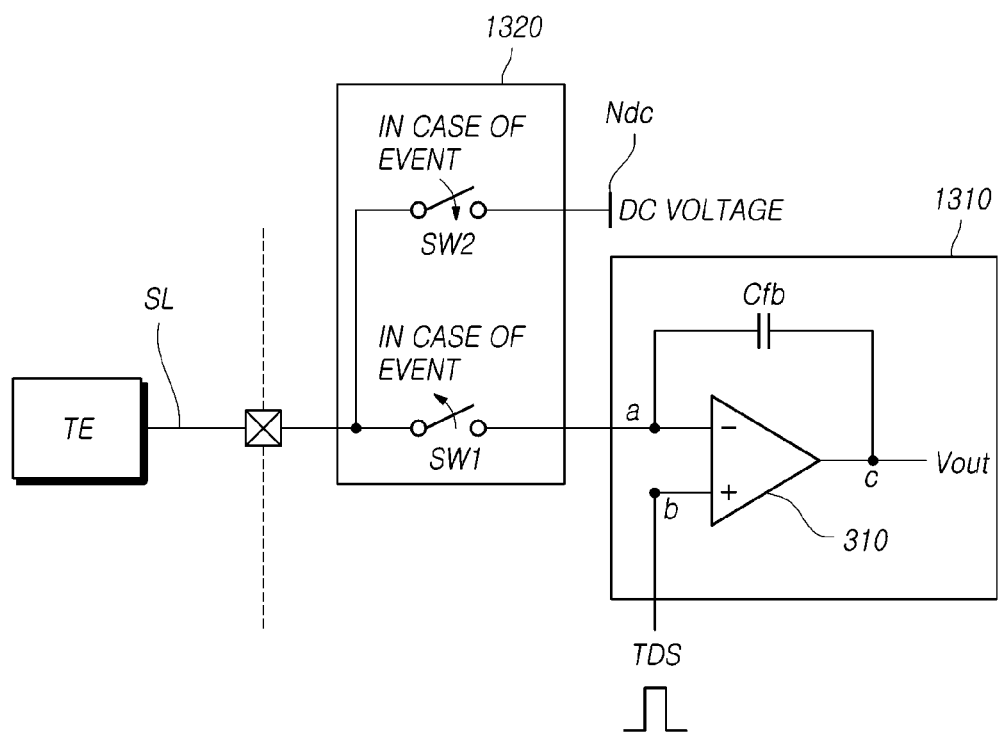

FIG. 15 shows the touch driving circuit 140 for the second driving method for sensing a touch on a partial area in case of a specific event in the touch display device 100 according to an aspect of the present disclosure. FIG. 15 shows the touch driving circuit 140 in case where a control point of the control unit 1320 is the output point a at which the touch driving signal TDS is output from the output unit 1310 and a control technique of the control unit 1320 is the second technique.

Referring to FIG. 15, in case where a control point of the control unit 1320 is the output point a at which the touch driving signal TDS is output from the output unit 1310 and a control technique of the control unit 1320 is the second technique, the control unit 1320 may include the first switch SW1 and a second switch SW2 that controls whether or not to connect the touch electrode TE to a DC voltage node Ndc.

Before an event occurs, the second switch SW2 can be turned off so as to disconnect the touch electrode TE from the DC voltage node Ndc.

After the event occurs, the second switch SW2 can be turned on so as to connect the touch electrode TE to the DC voltage node Ndc.

In other words, the second switch SW2 can control connection between a signal line SL connected to the touch electrode TE and the DC voltage node Ndc.

The second switch SW2 can be turned off before the event occurs so as to disconnect the signal line SL connected to the touch electrode TE and the DC voltage node Ndc. Also, the second switch SW2 can be turned off when the event occurs so as to electrically connect the signal line SL connected to the touch electrode TE and the DC voltage node Ndc.

Referring to FIG. 15, the amplifier 310 included in the touch driving circuit 140 includes the first terminal b into which the touch driving signal TDS is input, the second terminal a from which the touch driving signal TDS input into the first terminal b is output to the touch electrode TE, and the third terminal c from which a signal in response to a change in capacitance between the user's touch object and the touch electrode TE is output.

The first switch SW1 can be connected between the signal line SL connected to the touch electrode TE and the second terminal a corresponding to the point at which the touch driving signal TDS is output in the touch driving circuit 140.

The second switch SW2 can be connected between the signal line SL connected to the touch electrode TE and the DC voltage node Ndc.

According to the above description, in case of a specific event, by turning off the first switch SW1 and turning on the second switch SW2, it is possible to suppress the supply of the pulse-type (AC type) touch driving signal TDS for LFD driving to the touch electrode TE disposed in the second area A2.

Figure 16:
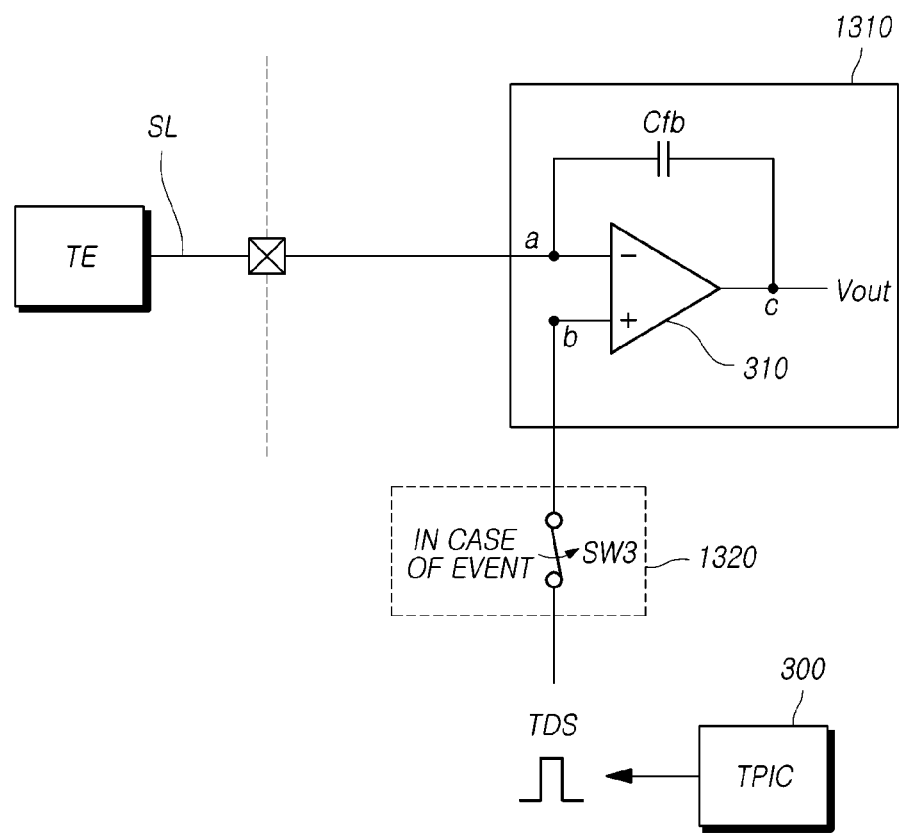

FIG. 16 shows the touch driving circuit 140 for the second driving method for sensing a touch on a partial area in case of a specific event in the touch display device 100 according to an aspect of the present disclosure. FIG. 16 shows the touch driving circuit 140 in case where a control point of the control unit 1320 is the input point b at which the touch driving signal TDS is input into the output unit 1310 and a control technique of the control unit 1320 is the first technique.

Referring to FIG. 16, in case where a control point of the control unit 1320 is the input point b at which the touch driving signal TDS is input into the output unit 1310 and a control technique of the control unit 1320 is the first technique, the control unit 1320 can include a third switch SW3 that controls whether or not to input the touch driving signal TDS into the output unit 1310.

Before an event occurs, the third switch SW3 can be turned on so as to input the touch driving signal TDS into the output unit 1310.

After the event occurs, the third switch SW3 can be turned off so as not to input the touch driving signal TDS into the output unit 1310.

In other words, the third switch SW3 can control connection between the TPIC 300 that supplies the touch driving signal TDS and the touch driving circuit 140.

The third switch SW3 can be turned on before the event occurs so as to connect the TPIC 300 to the touch driving circuit 140. Also, the third switch SW3 can be turned off when the event occurs so as to disconnect the TPIC 300 from the touch driving circuit 140.

Referring to FIG. 16, the amplifier 310 included in the output unit 1310 of the touch driving circuit 140 includes the first terminal b into which the touch driving signal TDS is input, the second terminal a from which the touch driving signal TDS input into the first terminal b is output to the touch electrode TE, and the third terminal c from which a signal in response to a change in capacitance between the user's touch object and the touch electrode TE is output.

The third switch SW3 can be connected between the first terminal b of the amplifier 310 and the TPIC 300.

According to the above description, in case of a specific event, by turning off the third switch SW3, the output unit 1310 of the touch driving circuit 140 cannot receive the touch driving signal TDS for LFD driving to the touch electrode TE disposed in the second area A2. Therefore, the touch electrode TE disposed in the second area A2 may be in a floating state as being electrically opened.

Figure 17:
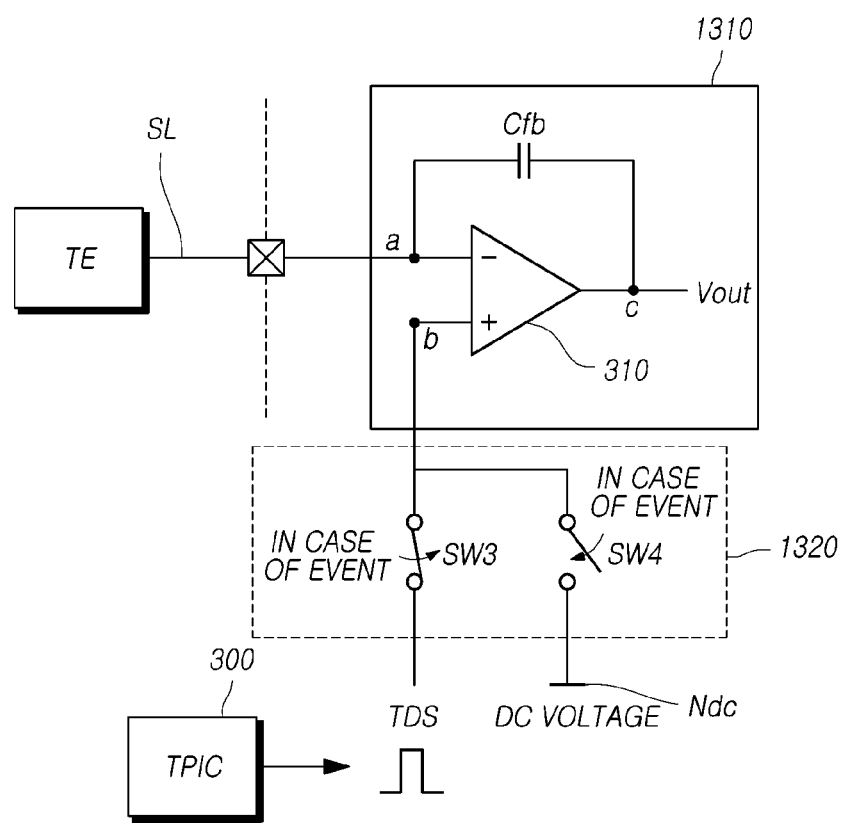

FIG. 17 shows the touch driving circuit 140 for the second driving method for sensing a touch on a partial area in case of a specific event in the touch display device 100 according to an aspect of the present disclosure. FIG. 17 shows the touch driving circuit 140 in case where a control point of the control unit 1320 is the input point b at which the touch driving signal TDS is input into the output unit 1310 and a control technique of the control unit 1320 is the second technique.

Referring to FIG. 17, in case where a control point of the control unit 1320 is the input point b at which the touch driving signal TDS is input into the output unit 1310 and a control technique of the control unit 1320 is the second technique, the control unit 1320 can include the third switch SW3 and a fourth switch SW4 that controls whether or not to input a DC voltage into the output unit 1310.

Before an event occurs, the fourth switch SW4 can be turned off so as not to input the DC voltage into the output unit 1310.

After the event occurs, the fourth switch SW4 can be turned on so as to input the DC voltage into the output unit 1310.

In other words, the fourth switch SW4 can control connection between the point b at which the touch driving signal TDS is supplied to the touch driving circuit 140 and the DC voltage node Ndc. That is, the fourth switch SW4 can be electrically connected between the output unit 1310 and the DC voltage node Ndc.

The fourth switch SW4 can be turned off before the event occurs so as to disconnect the point b at which the touch driving signal TDS is supplied to the touch driving circuit 140 from the DC voltage node Ndc. Also, the fourth switch SW4 can be turned on when the event occurs so as to connect the point b at which the touch driving signal TDS is supplied to the touch driving circuit 140 to the DC voltage node Ndc.

Referring to FIG. 17, the amplifier 310 included in the output unit 1310 of the touch driving circuit 140 includes the first terminal b into which the touch driving signal TDS is input, the second terminal a from which the touch driving signal TDS input into the first terminal b is output to the touch electrode TE, and the third terminal c from which a signal in response to a change in capacitance between the user's touch object and the touch electrode TE is output.

The third switch SW3 can be connected between the first terminal b corresponding to the point b at which the touch driving signal TDS is supplied to the touch driving circuit 140 and the TPIC 300.

Also, the fourth switch SW4 can be connected between the point b at which the touch driving signal TDS is supplied to the touch driving circuit 140 and the DC voltage node Ndc.

According to the above description, in case of a specific event, by turning off the third switch SW3 and turning on the fourth switch SW4, the output unit 1310 of the touch driving circuit 140 receives a DC voltage different from the touch driving signal TDS for LFD driving to the touch electrode TE disposed in the second area A2. Therefore, the touch electrode TE disposed in the second area A2 cannot be driven.

Figure 18:
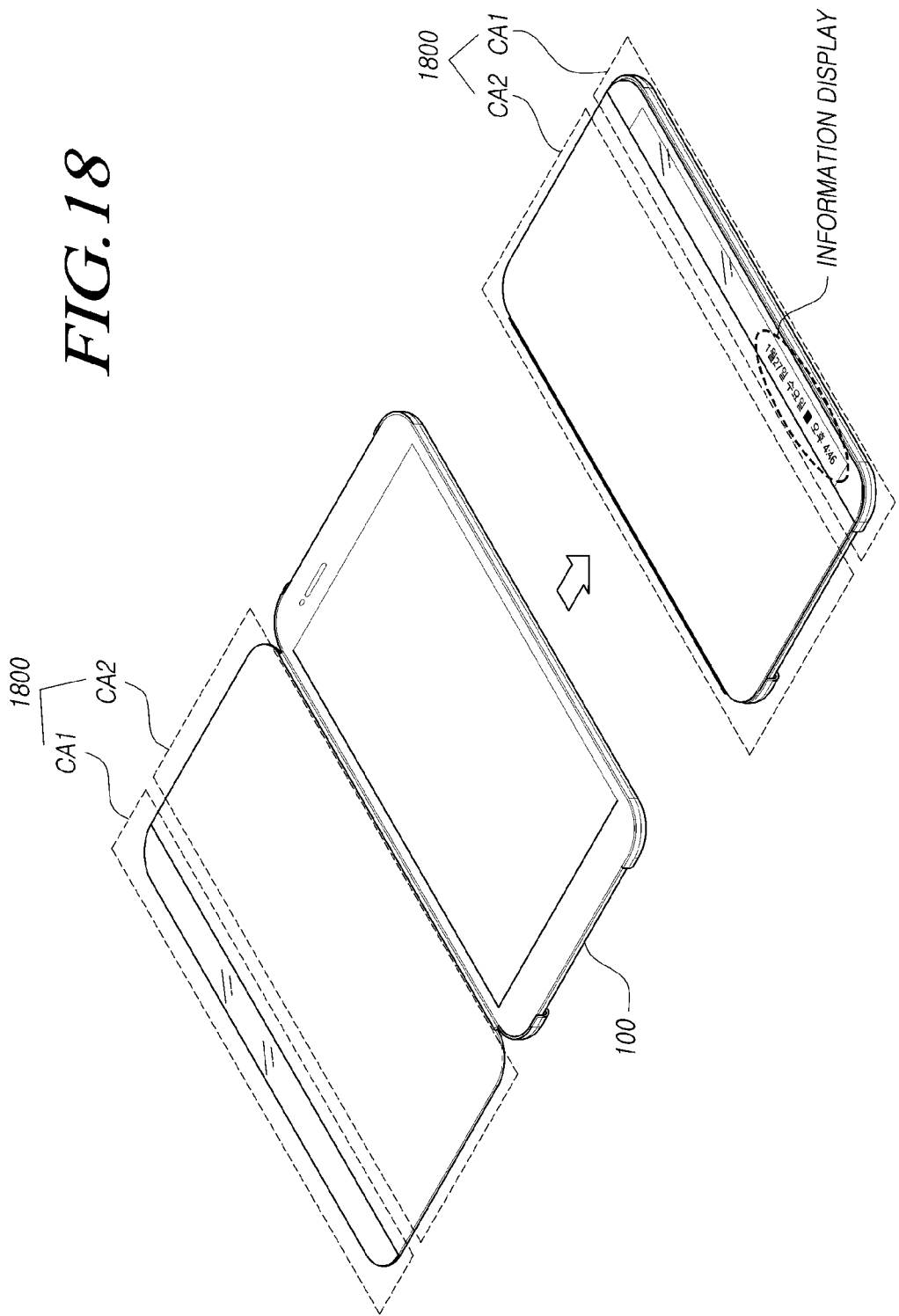
FIG. 18 is a diagram illustrating the touch display device and a cover case provided thereto according to an aspect of the present disclosure.

FIG. 18 is a diagram illustrating the touch display device 100 and a cover case 1800 provided thereto according to an aspect of the present disclosure.

The cover case 1800 can include a first cover area CA1 which can cover over the first area A1 of the display panel 110 and a second cover area CA2 which can cover over the second area A2 of the display panel 110.

The touch display device 100 can recognize whether or not the cover case 1800 covers the display panel 110 to perform a detection of an event, as will be described below with reference to FIG. 28.

If the first area A1 of the display panel 110 is covered with the first cover area CA1 of the cover case 1800, the first area A1 of the display panel 110 can become a touch sensing area and display area.

On the first area A1 of the display panel 110, information, including but not limited to weather information, various status information, application information, etc. can be displayed.

Therefore, the first cover area CA1 of the cover case 1800 can be transparent.

However, the second cover area CA2 of the cover case 1800 can be opaque.

Figure 19:
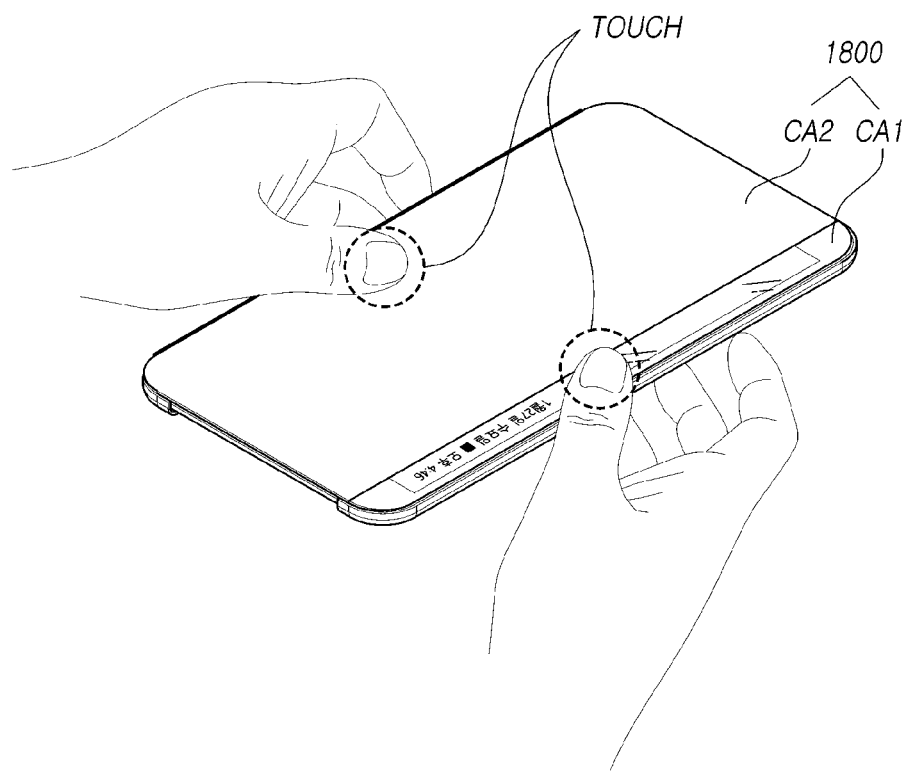
FIG. 19 is a diagram illustrating that a user touches a first cover area while holding a second cover area in a state where the display panel of the touch display device is covered with the cover according to an aspect of the present disclosure.

FIG. 19 is a diagram illustrating that a user touches a first cover area CA1 while holding a second cover area CA2 in a state where the display panel 110 of the touch display device 100 is covered with the cover 1800 according to an aspect of the present disclosure.

Referring to FIG. 19, when the display panel 110 is covered with the cover case 1800 including the first cover area CA1 corresponding to the first area A1 and the second cover area CA2 corresponding to the second area A2, the touch driving circuit 140 can directly recognize (detect) the occurrence of an event or can recognize the occurrence of an event from an input signal (e.g., via a control signal, mode signal, etc.).

According to the above description, even in a state where the cover case 1800 covers the display panel 110 of the touch display device 100, the user can accurately perform a touch through the first cover area CA1 of the cover case 1800.

In addition, even in a case where the cover case 1800 covers the display panel 110 of the touch display device 100, the user can check various information displayed on the first cover area CA1 of the cover case 1800.

It should be noted that the positioning of the first and second cover areas CA1 and CA2 on the cover case 1800 and relative to one another is not limited to examples described above. Also a number of separate and distinct first cover areas (CA1) and second cover areas (CA2) are not limited to the examples described above. For example, cover case 1800 can have a first cover area CA1 positioned between two different cover areas CA2 or a two first cover areas CA1 embedded within (encapsulated) within a single or two or more separate second cover areas CA2 (e.g., similar to the various configurations of the first and second areas A1 and A2 shown in FIGS. 22-25 described below).

Figure 20:
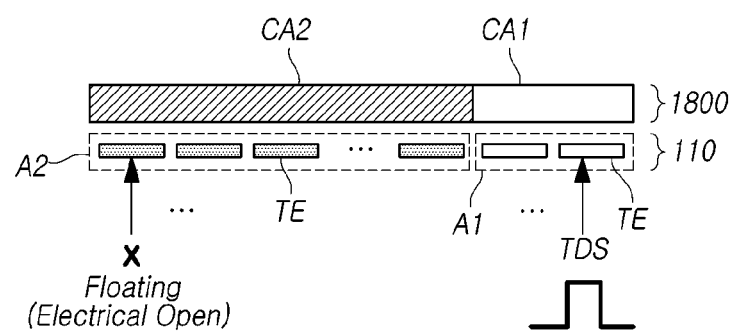
FIG. 20 is a diagram illustrating a first technique of the second driving method for sensing a touch on a partial area in a state where the display panel of the touch display device is covered with the cover according to an aspect of the present disclosure.
Figure 21:
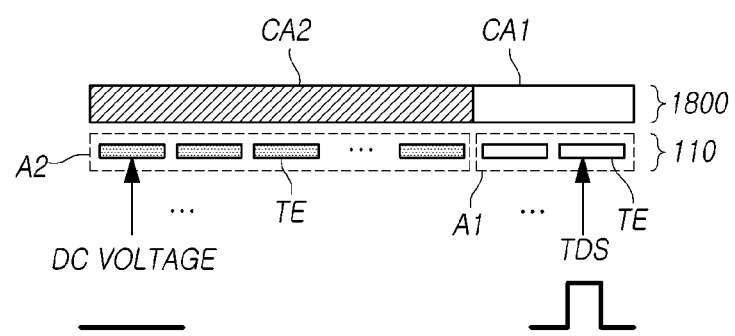
FIG. 21 is a diagram illustrating a second technique of the second driving method for sensing a touch on a partial area in a state where the display panel of the touch display device is covered with the cover according to an aspect of the present disclosure.

FIG. 20 is a diagram illustrating a first technique (floating) of the second driving method for sensing a touch on a partial area in a state where the display panel 110 of the touch display device 100 covered with the cover 1800 according to an aspect of the present disclosure. FIG. 21 is a diagram illustrating a second technique (DC voltage application) of the second driving method for sensing a touch on a partial area in a state where the display panel 110 of the touch display device 100 covered with the cover 1800 according to an aspect of the disclosure.

Referring to FIG. 20 and FIG. 21, when the cover case 1800 covers the display panel 110, the touch display device 100 may recognize the occurrence of a specific event in which only the first area A1 is set as a touch sensing area.

Therefore, the touch display device 100 performs LFD driving (touch driving) of the touch electrode(s) TE disposed in the first area A1 but does not perform LFD driving (touch driving) of the touch electrode(s) TE disposed in the second area A2 during the touch sensing section.

Since the cover case 1800 covers the display panel 110, an event occurs. Therefore, during the touch sensing section, the touch driving signal TDS is applied to all of touch electrodes TE positioned in the first area A1 but not applied to all of touch electrodes TE positioned in the second area A2.

For example, as illustrated in FIG. 20, all of the touch electrodes TE positioned in the second area A2 are electrically opened. Thus, they are in a floating state in which no voltage is applied.

In this case, as illustrated in FIG. 19, even if a touch is made to any point on the first cover area CA1 and the second cover area CA2 respectively corresponding to the first area A1 and the second area A2, a variation ΔVout in signal output from the output unit 1310 is as shown in the following Equation 3 (Eq. (3)), which is identical to Equation 1 that represents a variation ΔVout in signal output when the user touches only the first area A1 of the display panel 110 with the finger X on the right hand. In Eq. (3), Vout, Cfin, Cfb and Vlfd are as defined above with reference to Eq. (1) and/or Eq. (2).

$$\Delta Vout = [(Cfin/Cfb)*Vlfd] \qquad \text{Eq. (3)}$$

In another example, as illustrated in FIG. 21, all of the touch electrodes TE positioned in the second area A2 can have a DC voltage applied thereto, which is a signal different from the pulse-type (AC type) touch driving signal TDS.

In this case, as illustrated in FIG. 19, even if a touch is made to any point on the first cover area CA1 and the second cover area CA2 respectively corresponding to the first area A1 and the second area A2, a variation ΔVout in signal output from the output unit 1310 is as shown in the following Equation 4. Equation 4 (Eq. (4)) corresponds to Eq. (2) when a coupling voltage Vcouple is 0 (zero) and the right term [(Cfin'/Cfb)*Vcouple] is removed from Eq. 2 accordingly.

$$\Delta Vout = [(Cfin'/Cfb)*Vlfd] \qquad \text{Eq. (4)}$$

FIG. 22 through FIG. 25 show example layouts of the first area A1 and the second area A2 of the display panel 110 of the touch display device 100 according to an aspect of the present disclosure.

Referring to FIG. 22 through FIG. 25, the first area A1 of the display panel 110 may be at least one in number.

Figure 22:
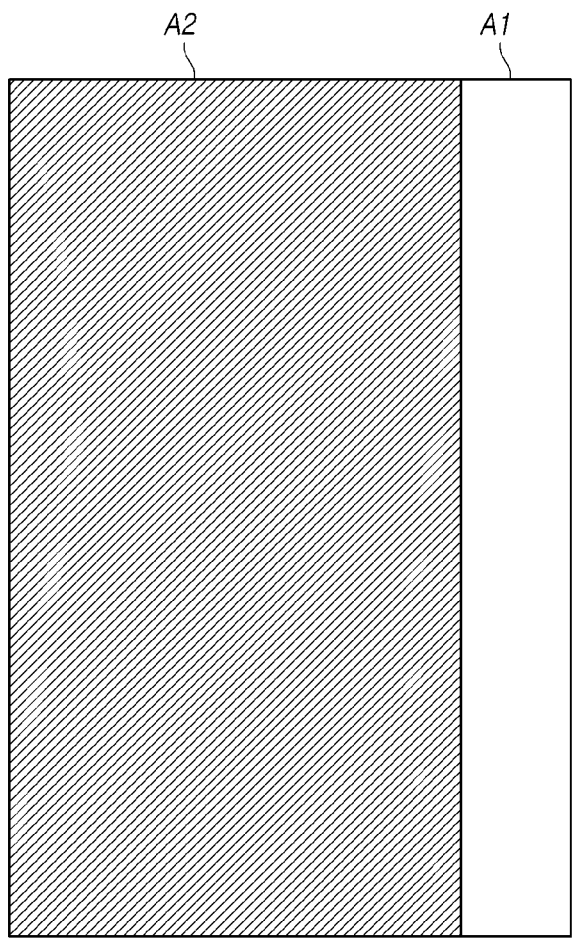
FIG. 22 through FIG. 25 show example layouts of the first area and the second area of the display panel of the touch display device according to an aspect of the present disclosure.

As illustrated in FIG. 22, the display panel 110 may be divided into one first area A1 and one second area A2. The one first area A1 may be on the right (or left) of the one second area A2.

Figure 23:
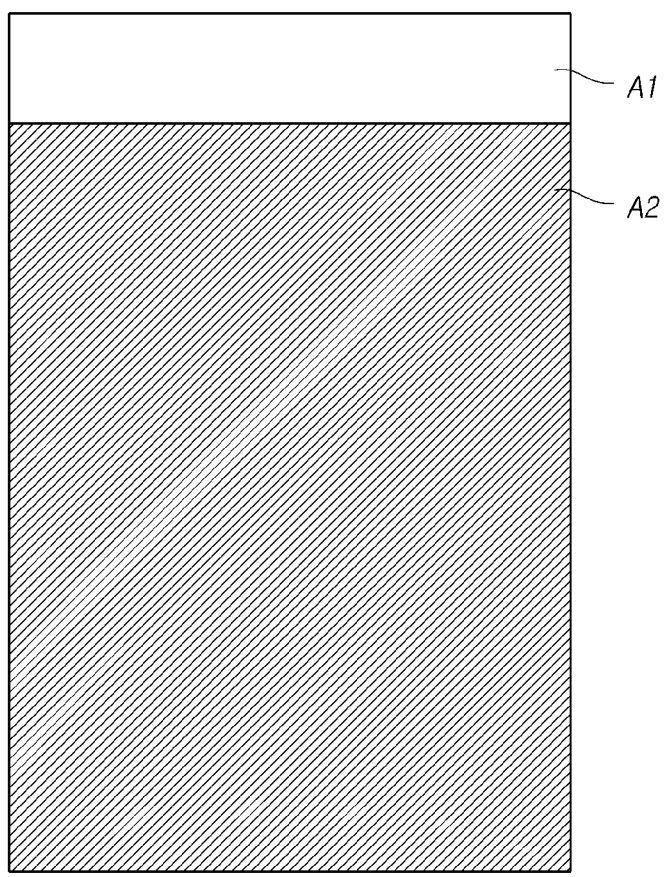

As illustrated in FIG. 23, the display panel 110 may be divided into one first area A1 and one second area A2. The one first area A1 may be on (or under) the one second area A2.

Figure 24:
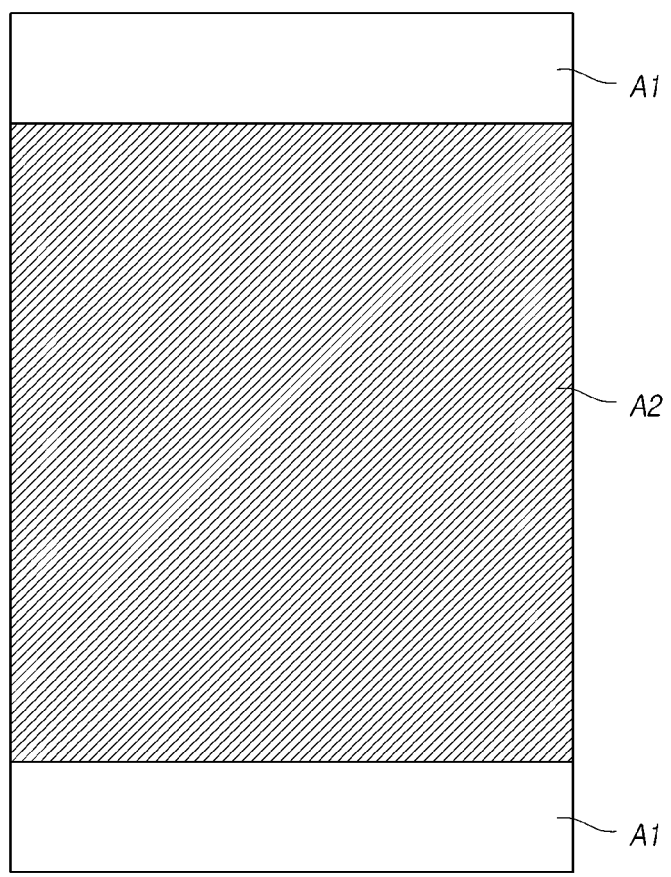

As illustrated in FIG. 24, the display panel 110 may be divided into two first areas A1 and one second area A2. The two first areas A1 may be on and under (or on the left and right of) the one second area A2.

Figure 25:
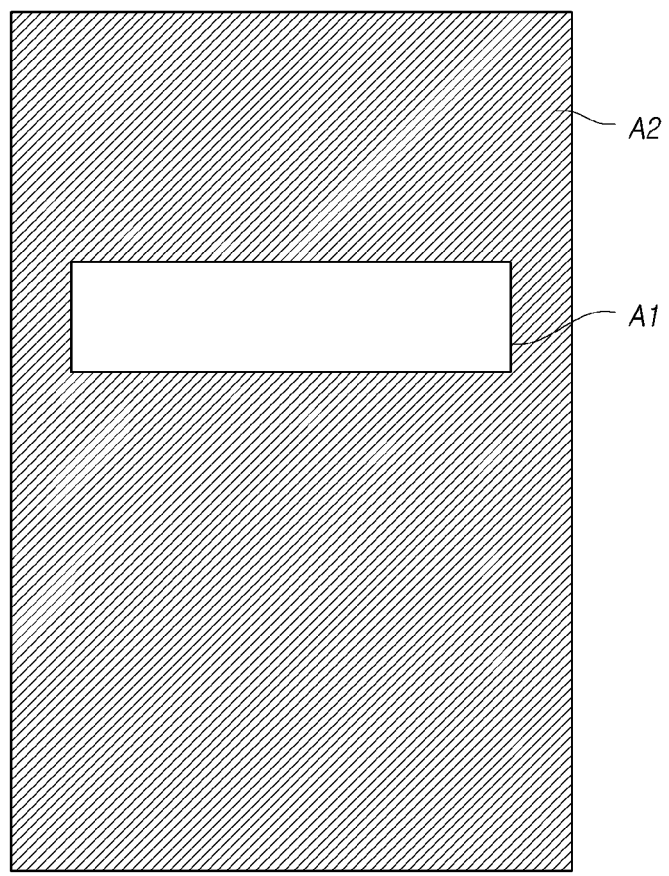

As illustrated in FIG. 25, the display panel 110 may be divided into one first area A1 and one second area A2. The one first area A1 may be surrounded by the one second area A2.

Meanwhile, the first area A1 of the display panel 110 may be a display area where a desired (and/or alternatively predetermined) image is displayed in case of an event.

While FIG. 22 through FIG. 25 illustrate different examples of positions of the first area A1 relative to the second area A2, the present disclosure is not limited thereto and any other arrangement of the first area A1 and the second area A2 is within the scope of the present disclosure. Also, the number of different first areas A1 and second areas A2 may be different.

When the first area A1 and the second area A2 of the display panel 110 are covered with the first cover area CA1 and the second cover area CA2 of the cover case 1800, it is recognized as the occurrence of a specific event.

The first cover area CA1 is formed of a material that does not become an impediment to capacitance-based touch sensing. Also, the first cover area CA1 is formed of a transparent material that enables the display on the first area A1 of the display panel 110 to be exposed.

According to the above description, even in a state where the cover case 1800 covers the display panel 110, the user can check necessary information through the first cover area CA1 or can touch the first cover area CA1 to perform a necessary input process.

Meanwhile, the touch driving signal TDS to be applied to the touch electrode TE during the touch sensing section after an event occurs may have a different signal intensity from the touch driving signal TDS to be applied to the touch electrode TE in the touch sensing section before the event occurs.

For example, if the cover case 1800 covers the display panel 110 and it is recognized as the occurrence of an event, a signal intensity of the touch driving signal TDS to be applied to the touch electrode TE during the touch sensing section after the event occurs may be (e.g., two times) higher than a signal intensity of the touch driving signal TDS to be applied to the touch electrode TE during the touch sensing section before the event occurs. Thus, even if the user touches the first cover area CA1 of the cover case 1800, an improved touch sensitivity can be provided.

As another example, if touch sensitivity in the first cover area CA1 does not actually need to be high, a signal intensity of the touch driving signal TDS to be applied to the touch electrode TE in the touch sensing section after the event occurs may be lower than a signal intensity of the touch driving signal TDS to be applied to the touch electrode TE in the touch sensing section before the event occurs. Therefore, power consumption of the touch display device 100 can be reduced.

The first area A1 and the second area A2 of the display panel 110 illustrated in FIG. 22 through FIG. 25 can be modified variously.

For example, the first area A1 and the second area A2 of the display panel 110 illustrated in FIG. 22 through FIG. 25 may be reversed. Further, one or more of a size, position, and number of each of the first area A1 and the second area A2 of the display panel 110 illustrated in FIG. 22 through FIG. 25 can be modified variously FIG. 26 is a driving timing diagram of data lines DL in the respective areas A1 and A2 of the touch display device 100 according to an aspect of the present disclosure.

Figure 26:
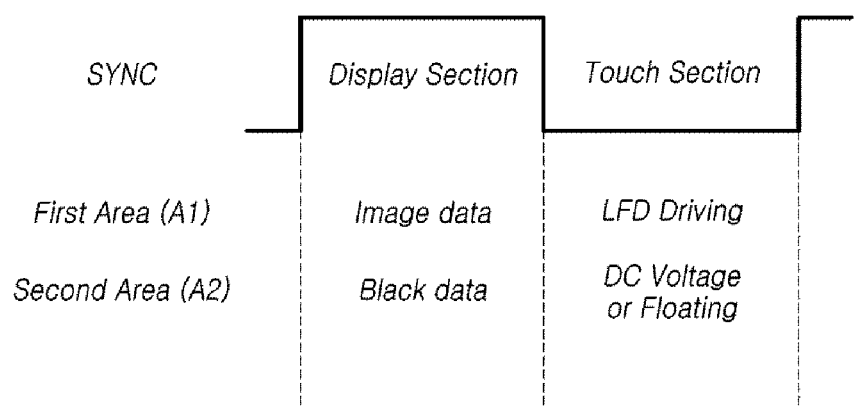
FIG. 26 is a driving timing diagram of data lines in the respective areas of the touch display device according to an aspect of the present disclosure.

Referring to FIG. 26, during the touch sensing section after a specific event occurs, a data line disposed in the first area A1 may be applied with a signal (load free driving signal) identical or corresponding to the touch driving signal TDS and a data line disposed in the second area A2 may be applied with a signal different from the touch driving signal TDS or may be in an electrically open state.

Referring to FIG. 26, in the display section after the event occurs, an image data voltage corresponding to image data for image display may be input into the data line disposed in the first area A1 and a black data voltage corresponding to black data may be input into the data line disposed in the second area A2.

Figure 27:
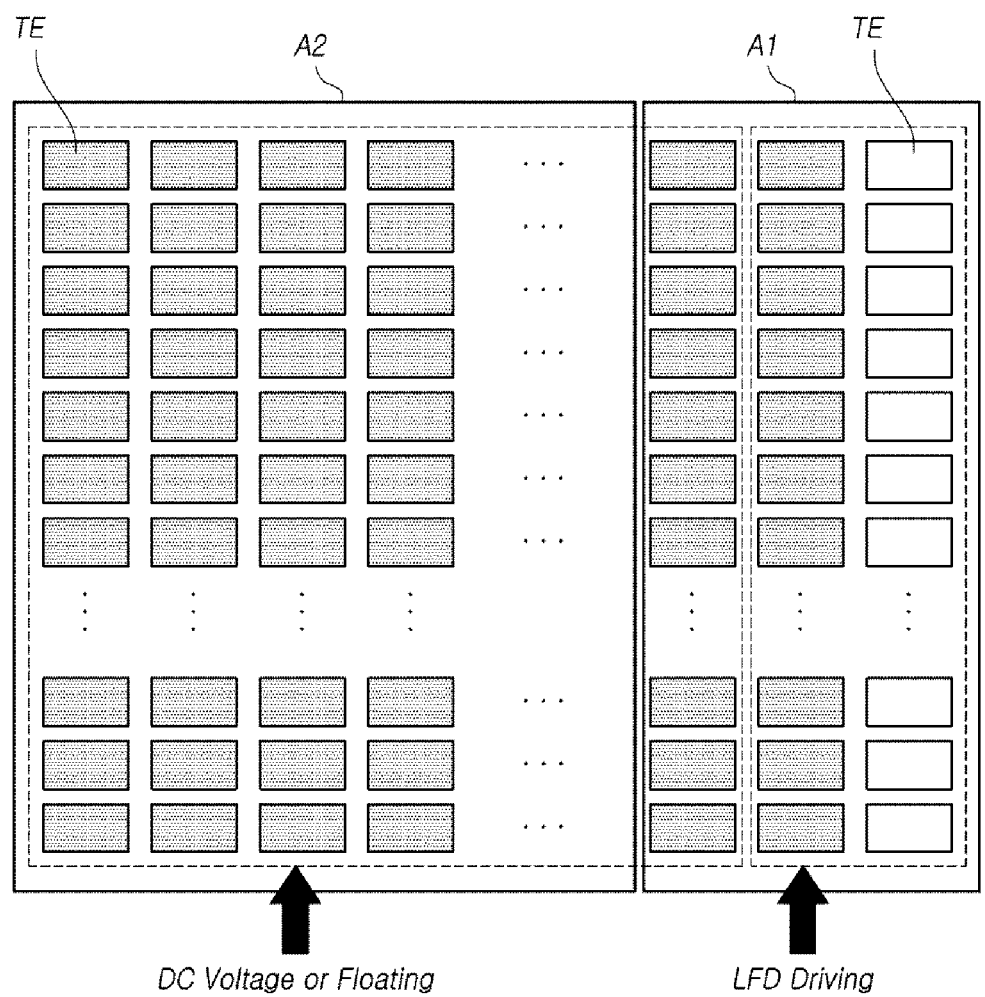
FIG. 27 is a diagram illustrating another example of the second driving method for sensing a touch on a partial area in case of a specific event in the touch display device according to an aspect of the present disclosure.

FIG. 27 is a diagram illustrating another example of the second driving method for sensing a touch on the first area A1 as a partial area in case of a specific event in the touch display device 100 according to an aspect of the present disclosure.

According to the above description, in the touch sensing section after a specific event occurs, all of touch electrodes TE positioned corresponding to the first area A1 may be applied with the touch driving signal TDS due to LFD driving.

Otherwise, as illustrated in FIG. 27, in the touch sensing section after a specific event occurs, LFD driving cannot be performed to touch electrodes TE disposed in one or more columns most adjacent to the second area A2 among the touch electrodes TE positioned corresponding to the first area A1.

That is, in the touch sensing section after the specific event occurs, touch electrodes TE disposed in at least one column most adjacent to the second area A2 among the touch electrodes TE positioned corresponding to the first area A1 can be applied with a signal different from the touch driving signal TDS or can be in an electrically open state.

Accordingly, it is possible to suppress a coupling phenomenon which can occur at a boundary between the first area A1 and the second area A2.

Figure 28:
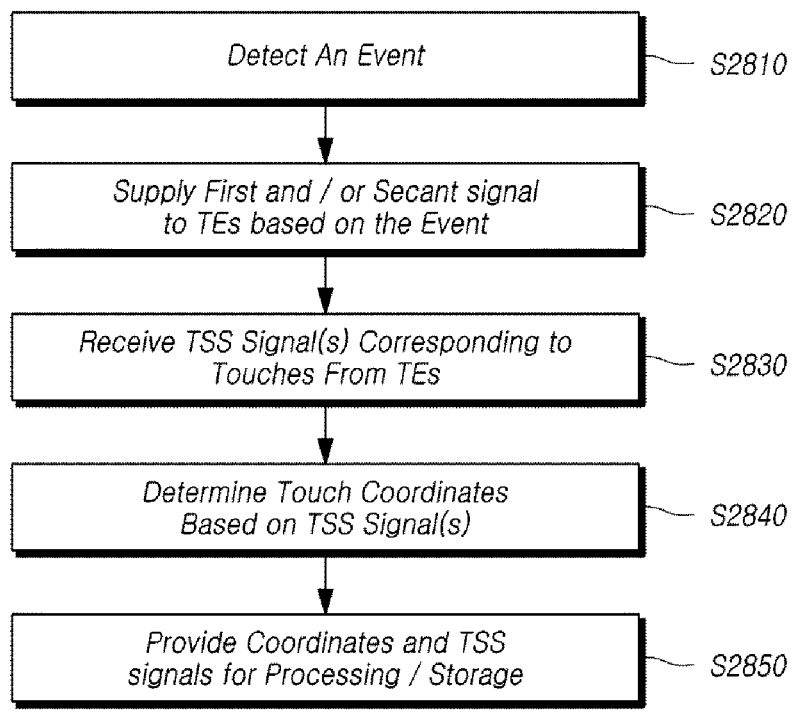
FIG. 28 is a flowchart illustrating a touch sensing method according to an aspect of the present disclosure.

FIG. 28 is a flowchart illustrating a touch sensing method according to an aspect of the present disclosure.

As shown in FIG. 28, at S2810, controller of the touch display device 100 detects an event, where the event can be (1) the entire display panel 110 being both a touch sensing area and a non-touch sensing area (e.g., a display area) (this corresponds to the normal state described above), (2) one or more portions of display panel 110 being touch sensing areas (and/or non-touch sensing areas) such as first area A1 described above while one or more other portions of display panel 110 being touch-non sensing areas (e.g., display areas only) such as second area A2 described above (this corresponds to the specific events defined and described above).

In one example, controller of the touch display device 100 detect an event by detecting whether a cover case having first and second cover areas, as described above with reference to FIG. 18, is in a closed position so as to cover the display panel 110. Accordingly, the normal state is when the cover case is in an open position.

At S2820, touch driving circuit 140 supplies a first signal and/or a second signal to touch electrodes TE of the display panel 110 based on the detection at S2810. For example, upon detecting event (1), described above with reference to S2810, touch driving circuit 140 supplies a first signal (e.g., touch driving signal TDS described above) to all of the touch electrodes TE of the display panel 110. In another example, upon detecting event (2), described above with reference to S2810, touch driving circuit 140 supplies a first signal (e.g., touch driving signal TDS described above) to the touch electrodes TE corresponding to one or more first areas A1 of the display panel 110 (which correspond to one or more first cover areas CA1 of the case cover 1800, described above). Upon detecting event (2), touch driving circuit 140 supplies a second signal (e.g., a DC voltage or a signal different from the first signal) to the touch electrodes TE corresponding to one or more second areas A2 of the display panel 110 (which correspond to one or more first cover areas CA2 of the case cover 1800, described above). In one example, instead of applying the second signal to touch electrodes TE of the one or more second areas A2, these touch electrodes TE are maintained in an electrically open state.

At S2830 and upon receiving one or more touches (by a user or a tool such as a stylus used by a user) on the display panel 110, the touch driving circuit 140 receives a separate touch sensing signal (TSS) for each of the one or more touches. At S2840, the touch processor 150 shown in FIG. 1, determines coordinates corresponding to each received one or more touch based on the corresponding TSS received at S2830. Thereafter, at S2850, the sensed one or more touches and corresponding coordinates may be provided to a controller of the touch display device 100 and/or stored in a memory of the touch display device 100 for further processing. the touch sensing method may include outputting the touch driving signal TDS to some or all of the plurality of touch electrodes TE disposed in the entire area of a screen and sensing a touch or non-touch or touch coordinates on the entire area of the screen (S2810), recognizing the occurrence of an event in which the first area A1 corresponding to a part of the screen is set as a touch sensing area (S2820), and sensing a touch or non-touch or touch coordinates on the first area of the screen by outputting a signal different from the touch driving signal TDS to a touch electrode TE corresponding to a second area A2 or electrically opening the touch electrode TE corresponding to the second area A2 and outputting the touch driving signal TDS to a touch electrode TE corresponding to the first area A1 of the screen when the occurrence of the event is recognized (S2830).

According to the above-described touch sensing method, if a touch is sensed only in a part of the display panel 110, it is possible to suppress application of a signal identical or corresponding to the touch driving signal TDS to the other area A2 except the touch sensing area. Thus, it is possible to suppress a touch sensitivity decrease in the first area A1 of the display panel 110.

Examples described above relate to the touch display device 100, the touch driving circuit 140, and the touch sensing method. If there occurs an event in which the first area A1 corresponding to a part of the touch screen panel TSP is set as a touch sensing area, while the touch driving signal TDS is output to a touch electrode TE corresponding to the first area A1 during the touch sensing section, a touch electrode TE corresponding to the second area A2 may have a signal different from the touch driving signal TDS applied thereto or may be electrically opened. Thus, if only a part of the screen of the touch display panel 100 is a touch sensing area, a touch sensitivity decrease caused by the other area can be suppressed.

According to some examples, it is possible to provide the touch display device 100, the touch driving circuit 140, and the touch sensing method which make it possible to suppress a sharp decrease in touch sensitivity to a touch on a touch sensing area even when a touch occurs in both the touch sensing area and a non-touch sensing area if only the part A1 of the screen is set as the touch sensing area.

According to some examples, it is possible to provide the touch display device 100, the touch driving circuit 140, and the touch sensing method which make it possible to accurately sense a touch through the part CA1 of the cover case 1800 covering the screen of the touch display device 100 when only a part of the screen is exposed through the part CA1 of the cover case 1800.

The foregoing description and the accompanying drawings are provided only to illustrate the technical conception of the present disclosure, but it will be understood by a person having ordinary skill in the art that various modifications and changes such as combinations, separations, substitutions, and alterations of the components may be made without departing from the scope of the present disclosure. Therefore, the examples of the present disclosure are provided for illustrative purposes only but not intended to limit the technical concept of the present disclosure. The scope of the technical concept of the present disclosure is not limited thereto. Therefore, it should be understood that the above-described examples are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A touch display device comprising:
    a touch screen panel including a plurality of touch electrodes; and
    a touch driving circuit configured to output a touch driving signal to at least a portion of the plurality of touch electrodes for sensing a touch initiated by a pointer, and including an output unit including a first input terminal through which the touch driving signal is input, and a second input terminal, and a control unit controlling the outputting of the touch driving signal from the output unit to the at least a portion of the plurality of touch electrodes, and including a first switch configured to control a connection between the second input terminal and the at least a portion of the plurality of touch electrodes, and a second switch configured to control a connection between a direct current (DC) voltage node and the at least a portion of the plurality of touch electrodes,
    wherein, upon detection of an event in which at least one first area of the touch screen panel is set as a touch sensing area and at least one second area of the touch screen panel is set as a non-touch sensing area, the touch driving circuit is configured to output the touch driving signal to one or more of the plurality of touch electrodes that correspond to the at least one first area,
    a plurality of data lines and a plurality of gate lines to supply signals for displaying images and overlapping the at least one first area and the at least second area,
    wherein, before the event is detected during a touch sensing section, at least one data line of the plurality of data lines or at least one gate line of the plurality of gate lines overlapping the at least one first area and the at least one second area is supplied with a signal having a same or corresponding voltage value as the touch driving signal supplied through a plurality of signal lines to one or more of the plurality of touch electrodes that correspond to the at least one first area and the at least one second area to suppress a parasitic capacitance formed between the one or more of the plurality of touch electrodes corresponding to the at least one first area and the at least one second area and the at least one data line overlapping the at least one first area and the at least one second area, or the parasitic capacitance formed between the one or more plurality of touch electrodes corresponding to the at least one first area and at least one second area and the at least one gate line overlapping the at least one first area and the at least one second area, and
    wherein, when the event is detected during the touch sensing section, at least one data line of the plurality of data lines or at least one gate line of the plurality of gate lines overlapping the at least one first area is supplied with a signal having a same or corresponding voltage value as the touch driving signal supplied through a plurality of signal lines to one or more of the plurality of touch electrodes that correspond to the at least one first area to suppress a parasitic capacitance formed between the one or more of the plurality of touch electrodes corresponding to the at least one first area and the at least one data line overlapping the at least one first area, or the parasitic capacitance formed between the one or more plurality of touch electrodes corresponding to the at least one first area and the at least one gate line overlapping the at least one first area,
    wherein the at least one data line or at least one gate line overlapping the at least one first area is supplied with the signal from a circuit integrated with the touch driving circuit or the touch driving circuit, and
    wherein, when the event is detected during the touch sensing section, while the at least one data line of the plurality of data lines or the at least one gate line of the plurality of gate lines overlapping the at least one second area is not supplied with the signal having the same or corresponding voltage value as the touch driving signal supplied through the plurality of signal lines to the one or more of the plurality of touch electrodes that correspond to the at least one second area, a direct current (DC) voltage which is a signal different from the touch driving signal is output to the one or more of the plurality of touch electrodes that correspond to the at least one second area,
    wherein, after the event is detected during a display section, an image data voltage corresponding to image data for image display is supplied to the at least one data line overlapping the at least one first area and a black data voltage corresponding to black data is supplied to the at least one data line overlapping the at least one second area, and
    wherein before the event is detected during the touch sensing section, the second switch is turned off, and when the event is detected during the touch sensing section, the second switch is turned on and the one or more of the plurality of touch electrodes that correspond to the at least one second area is connected to the DC voltage node.

2. The touch display device according to claim 1, wherein the touch driving circuit is configured to detect the event when the touch screen panel is covered with a cover case including at least one first cover area corresponding to the at least one first area and at least one second cover area corresponding to the at least one second area.

3. The touch display device according to claim 1, wherein, after the event is detected,
at least one second data line in the at least one second area is applied with a signal different from the touch driving signal or is in an electrically open state.

4. The touch display device according to claim 1, wherein in the touch sensing area, after the event is detected, one or more touch electrodes in at least one column of the at least one first area that are most adjacent to the at least one second area are applied with a signal different from the touch driving signal or are in an electrically open state.

5. The touch display device according to claim 1, wherein an intensity of the touch driving signal to be applied to the one or more touch electrodes in the touch sensing area changes after the event is detected compared to when the event is not detected.

6. The touch display device according to claim 1, wherein in the touch sensing area, after the event is detected,
at least one second gate line in the at least one second area is applied with a signal different from the touch driving signal or is in an electrically open state.

7. A touch driving circuit configured to drive a plurality of touch electrodes in a touch screen panel, the touch driving circuit comprising:
an output unit configured to provide an input touch driving signal to at least a portion of the plurality of touch electrodes for sensing a touch initiated by a pointer and including a first input terminal through which the touch driving signal is input and a second input terminal; and
a control unit configured to, upon detection of an event according to which a first area of the touch screen panel is set to be a touch sensing area and a second area of the touch screen panel is set to be a non-touch sensing area,
provide the input touch driving signal to one or more of the plurality of touch electrodes corresponding to the first area, and
one of (1) provide a signal different from the touch driving signal to one or more of the plurality of touch electrodes corresponding to the second area of the touch screen panel, or (2) control the one or more of the plurality of touch electrodes corresponding to the second area to be in an electrically open state, and
a plurality of data lines and a plurality of gate lines to supply signals for displaying images and overlapping the first area and the second area,
wherein the control unit comprising:
a first switch configured to control a connection between the second input terminal and each of the portion of the plurality of the touch electrode; and
a second switch configured to control a connection between a direct current (DC) voltage node and each of each of the portion of the plurality of the touch electrode,
wherein, before the event is detected during a touch sensing section, at least one data line of the plurality of data lines or at least one gate line of the plurality of gate lines overlapping the at least one first area and the at least one second area is supplied with a signal having a same or corresponding voltage value as the touch driving signal supplied through a plurality of signal lines to one or more of the plurality of touch electrodes that correspond to the at least one first area and the at least one second area to suppress a parasitic capacitance formed between the one or more of the plurality of touch electrodes corresponding to the at least one first area and the at least one second area and the at least one data line overlapping the at least one first area and the at least one second area, or the parasitic capacitance formed between the one or more plurality of touch electrodes corresponding to the at least one first area and at least one second area and the at least one gate line overlapping the at least one first area and the at least one second area,
wherein, when the event is detected during the touch sensing section, at least one data line of the plurality of data lines or at least one gate line of the plurality of data lines overlapping the first area is supplied with a signal having a same or corresponding voltage value as the touch driving signal supplied through a plurality of signal lines to one or more of the plurality of touch electrodes that correspond to the first area to suppress a parasitic capacitance formed between the one or more of the plurality of touch electrodes corresponding to the first area and the at least one data line overlapping the one first area, or the parasitic capacitance formed between the one or more of the plurality of touch electrodes corresponding to the one first area and the at least one gate line overlapping the one first area,
wherein the at least one data line or at least one gate line overlapping the first area is supplied with the signal from a circuit integrated with the touch driving circuit or the touch driving circuit, and
wherein, when the event is detected during the touch sensing section, while the at least one data line of the plurality of data lines or the at least one gate line of the plurality of gate lines overlapping the at least one second area is not supplied with the signal having the same or corresponding voltage value as the touch driving signal supplied through the plurality of signal lines to the one or more of the plurality of touch electrodes that correspond to the at least one second area, a direct current (DC) voltage which is a signal different from the touch driving signal is output to the one or more of the plurality of touch electrodes that correspond to the at least one second area,
wherein, after the event is detected during a display section, an image data voltage corresponding to image data for image display is supplied to the at least one data line overlapping the at least one first area and a black data voltage corresponding to black data is supplied to at least the one data line overlapping the at least one second area, and
wherein before the event is detected, the second switch is turned off to disconnect the one or more of the plurality of touch electrodes from the DC voltage node, and after the event is detected, the second switch is turned on to connect the one or more of the plurality of touch electrode to the DC voltage node.

8. The touch driving circuit according to claim 7, wherein before event is detected, the first switch is turned on to connect the output unit to the touch electrode, and after event is detected, the first switch is turned off to disconnect the output unit from the touch electrode.

9. The touch driving circuit according to claim 7, wherein the control unit includes a third switch configured to control inputting the touch driving signal into the output unit,
before the event is detected, the third switch is turned on to input the touch driving signal into the output unit, and after the event is detected, the third switch is turned off to not input the touch driving signal into the output unit.

10. The touch driving circuit according to claim 9, wherein the control unit includes a fourth switch configured to control inputting of a direct current (DC) voltage into the output unit,
before the event is detected, the fourth switch is turned off to not input the DC voltage into the output unit, and
after the event is detected, the fourth switch is turned on so as to input the DC voltage into the output unit.

11. The touch driving circuit according to claim 7, wherein in the touch sensing area, after the event is detected,
at least one first data line in the first area is applied with a signal identical to the touch driving signal, and
at least one second data line in the second area is applied with a signal different from the touch driving signal or is in an electrically open state.

12. The touch driving circuit according to claim 7, wherein in the touch sensing area, after the event is detected, one or more touch electrodes in at least one column of the first area that are most adjacent to the second area are applied with a signal different from the touch driving signal or are in an electrically open state.

13. The touch driving circuit according to claim 7, wherein an intensity of the touch driving signal to be applied to the one or more touch electrodes in the touch sensing area changes after the event is detected compared to when the event is not detected.

14. A method comprising:
supplying a touch driving signal to a plurality of touch electrodes forming a touch display of a device including a touch driving circuit that is configured to output the touch driving signal to at least a portion of the plurality of touch electrodes for sensing a touch, and includes an output unit including a first input terminal through which the touch driving signal is input, and a second input terminal, and a control unit controlling the outputting of the touch driving signal from the output unit to the at least a portion of the plurality of touch electrodes, and including a first switch configured to control a connection between the second input terminal and the at least a portion of the plurality of touch electrodes, and a second switch configured to control a connection between a direct current (DC) voltage node and the at least a portion of the plurality of touch electrodes;
detecting an event, the event resulting in partitioning the touch display into at least one first area and at least one second area;
upon detecting the event, outputting the touch driving signal to one or more of the plurality of touch electrodes corresponding to the at least one first area for sensing at least one first touch; and
controlling one or more of the plurality of touch electrodes corresponding to the at least one second area such that at least one second touch anywhere on the at least one second area is distinguishable from the at least one first touch; and
determining coordinates of the at least one first touch and the at least one second touch,
wherein the touch device includes a plurality of data lines and a plurality of gate lines to supply signals for displaying images and overlapping the at least one first area and the at least one second area,
wherein, before the event is detected during a touch sensing section, at least one data line of the plurality of data lines or at least one gate line of the plurality of gate lines overlapping the at least one first area and the at least one second area is supplied with a signal having a same or corresponding voltage value as the touch driving signal supplied through a plurality of signal lines to one or more of the plurality of touch electrodes that correspond to the at least one first area and the at least one second area to suppress a parasitic capacitance formed between the one or more of the plurality of touch electrodes corresponding to the at least one first area and the at least one second area and the at least one data line overlapping the at least one first area and the at least one second area, or the parasitic capacitance formed between the one or more plurality of touch electrodes corresponding to the at least one first area and at least one second area and the at least one gate line overlapping the at least one first area and the at least one second area,
wherein, when the event is detected during the touch sensing section, at least one data line of the plurality of data lines or at least one gate line of the plurality of gate lines overlapping the at least one first area is supplied with a signal having a same or corresponding voltage value as the touch driving signal supplied through a plurality of signal lines to one or more of the plurality of touch electrodes that correspond to the at least one first area to suppress a parasitic capacitance being formed between the one or more of the plurality of touch electrodes corresponding to the at least one first area and the at least one data line overlapping the at least one first area, or the parasitic capacitance formed between the one or more of the plurality of touch electrodes corresponding to the at least one first area and the at least one gate line overlapping the at least one first area,
wherein the at least one data line or the at least one gate line overlapping the at least one first area is supplied with the signal from a circuit integrated with the touch driving circuit or the touch driving circuit,
wherein, when the event is detected during the touch sensing section, while the at least one data line of the plurality of data lines or the at least one gate line of the plurality of gate lines overlapping the at least one second area is not supplied with the signal having the same or corresponding voltage value as the touch driving signal supplied through the plurality of signal lines to the one or more of the plurality of touch electrodes that correspond to the at least one second area, a direct current (DC) voltage which is a signal different from the touch driving signal is output to the one or more of the plurality of touch electrodes that correspond to the at least one second area,
wherein, after the event is detected during a display section, an image data voltage corresponding to image data for image display is supplied to the at least one data line overlapping the at least one first area and a black data voltage corresponding to black data is supplied to the at least one data line overlapping the at least one second area, and
wherein before the event is detected during the touch sensing section, the second switch is turned off, and when the event is detected during the touch sensing section, the second switch is turned on and the one or more of the plurality of touch electrodes that correspond to the at least one second area is connected to the DC voltage node.

15. The method of claim 14, wherein the detecting an event detects the event when a cover case is closed covering a portion of a surface of the touch display, the cover case having at least one first cover portion and at least one second cover portion corresponding to the at least one first portion and the at least one second portion of the touch display, respectively.

16. The method of claim 14, wherein the controlling controls the second portion of the plurality of touch electrodes by outputting a signal different from the touch driving signal to each of the second portion of the plurality of touch electrodes.

17. The method of claim 14, wherein the controlling controls the second portion of the plurality of touch electrodes by maintaining each of the second portion of the plurality of touch electrodes in an electrically open state.

18. A touch display device comprising:
   a touch screen panel in which a plurality of touch electrodes is disposed;
   a touch driving circuit configured to drive some or all of the plurality of touch electrodes during a touch sensing section and including an output unit including a first input terminal through which a touch driving signal is input, and a second input terminal, and a control unit controlling the outputting of the touch driving signal from the output unit to some or all of the plurality of touch electrodes, and including a first switch configured to control a connection between the second input terminal and some or all of the plurality of touch electrodes, and a second switch configured to control a connection between a direct current (DC) voltage node and some or all of the plurality of touch electrodes,
   wherein during the touch sensing section, one or more touch electrodes corresponding to one or more first areas of the touch screen panel are applied with the touch driving signal and one or more touch electrodes corresponding to one or more second areas of the touch screen panel different from the one or more first areas are applied with a signal different from the touch driving signal or are in an electrically open state; and
   a plurality of data lines and a plurality of gate lines to supply signals for displaying images and overlapping the one or more first areas and the one or more second area,
   wherein, before the event is detected during the touch sensing section, at least one data line of the plurality of data lines or at least one gate line of the plurality of gate lines overlapping the at least one first area and the at least one second area is supplied with a signal having a same or corresponding voltage value as the touch driving signal supplied through a plurality of signal lines to one or more of the plurality of touch electrodes that correspond to the at least one first area and the at least one second area to suppress a parasitic capacitance formed between the one or more of the plurality of touch electrodes corresponding to the at least one first area and the at least one second area and the at least one data line overlapping the at least one first area and the at least one second area, or the parasitic capacitance formed between the one or more plurality of touch electrodes corresponding to the at least one first area and at least one second area and the at least one gate line overlapping the at least one first area and the at least one second area, and
   wherein, when the event is detected during the touch sensing section, at least one first data line of the plurality of data lines or at least one first gate line of the plurality of data lines overlapping the one or more first areas is supplied to a signal having a same or corresponding voltage value as the touch driving signal supplied through a plurality of signal lines to one or more of the plurality of touch electrodes that correspond to the one or more first areas to suppress a parasitic capacitance being formed between the one or more of the plurality of touch electrodes corresponding to the one or more first areas and the at least one data line overlapping the one or more first areas, or the parasitic capacitance formed between the one or more of the plurality of touch electrodes corresponding to the one or more first area and the at least one gate line overlapping the one or more first areas,
   wherein the at least one data line of the plurality of data lines or at least one gate line of the plurality of gate lines in the touch sensing area overlapping the one or more second areas adjacent to the one or more first areas is supplied with the signal from a circuit integrated with the touch driving circuit or the touch driving circuit,
   wherein, when the event is detected during the touch sensing section, while the at least one data line of the plurality of data lines or the at least one gate line of the plurality of gate lines overlapping the at least one second area is not supplied with the signal having the same or corresponding voltage value as the touch driving signal supplied through the plurality of signal lines to the one or more of the plurality of touch electrodes that correspond to the at least one second area, a direct current (DC) voltage which is a signal different from the touch driving signal is output to the one or more of the plurality of touch electrodes that correspond to the at least one second area,
   wherein, after the event is detected during a display section, an image data voltage corresponding to image data for image display is supplied to the at least one data line overlapping the at least one first area and a black data voltage corresponding to black data is supplied to the at least one data line overlapping the at least one second area, and
   wherein before the event is detected during the touch sensing section, the second switch is turned off, and when the event is detected during the touch sensing section, the second switch is turned on and the one or more of the plurality of touch electrodes that correspond to the at least one second area is connected to the DC voltage node.

19. The touch display device according to claim 18, wherein when an event occurs,
   the one or more touch electrodes corresponding to the one or more first areas are applied with the touch driving signal, and
   the one or more touch electrodes corresponding to the one or more second areas are applied with a signal different from the touch driving signal or are in an electrically open state.

20. The touch display device according to claim 19, wherein the signal that is different from the touch driving signal is different with respect to at least one signal characteristic, the least one signal characteristic including a signal amplitude, a signal phase, a signal voltage polarity, and a signal frequency.

* * * * *